US012353159B2

(12) United States Patent
Okamoto et al.

(10) Patent No.: US 12,353,159 B2
(45) Date of Patent: Jul. 8, 2025

(54) FIXING DEVICE AND IMAGE FORMING APPARATUS

(71) Applicants: Jun Okamoto, Tokyo (JP); Yuusuke Furuichi, Kanagawa (JP); Seiji Saitoh, Kanagawa (JP); Tamotsu Ikeda, Tokyo (JP); Shigeo Nanno, Kyoto (JP)

(72) Inventors: Jun Okamoto, Tokyo (JP); Yuusuke Furuichi, Kanagawa (JP); Seiji Saitoh, Kanagawa (JP); Tamotsu Ikeda, Tokyo (JP); Shigeo Nanno, Kyoto (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/599,370

(22) Filed: Mar. 8, 2024

(65) Prior Publication Data

US 2024/0310776 A1 Sep. 19, 2024

(30) Foreign Application Priority Data

Mar. 17, 2023 (JP) ................................ 2023-043244

(51) Int. Cl.
*G03G 15/20* (2006.01)
*G03G 21/16* (2006.01)

(52) U.S. Cl.
CPC ......... *G03G 21/1619* (2013.01); *G03G 15/20* (2013.01); *G03G 21/1633* (2013.01); *G03G 21/1647* (2013.01); *G03G 21/1652* (2013.01); *G03G 2221/1639* (2013.01)

(58) Field of Classification Search
CPC ............... G03G 15/20; G03G 15/2027; G03G 21/1619; G03G 21/1633; G03G 21/1647; G03G 21/1652; G03G 21/1685; G03G 2221/1639
See application file for complete search history.

(56) References Cited

U.S. PATENT DOCUMENTS

2013/0004192 A1* 1/2013 Kawakami ......... G03G 15/2039 399/328
2019/0286028 A1 9/2019 Furuichi et al.
2020/0033771 A1 1/2020 Furuichi et al.
2020/0103796 A1 4/2020 Furuichi et al.
2020/0103797 A1 4/2020 Furuichi
2020/0103803 A1 4/2020 Furuichi
2020/0103814 A1 4/2020 Someya et al.
2020/0249601 A1 8/2020 Inoue et al.
(Continued)

FOREIGN PATENT DOCUMENTS

JP H11-202656 A 7/1999
JP 2022-071715 A 5/2022

*Primary Examiner* — Sophia S Chen
(74) *Attorney, Agent, or Firm* — XSENSUS LLP

(57) ABSTRACT

A fixing device detachably attachable to an image forming apparatus includes a housing frame having an open front side in an insertion direction in which the fixing device is inserted into the image forming apparatus. The housing frame includes a support plate, as a back side of the housing frame in the insertion direction, and a pair of side plates extending in the insertion direction. The support plate includes an extension extending beyond one of the pair of side plates. The extension includes an engaged portion to be engaged with an engaging portion of the image forming apparatus when the fixing device is mounted on the image forming apparatus.

7 Claims, 23 Drawing Sheets

(56) References Cited

U.S. PATENT DOCUMENTS

| | | | | |
|---|---|---|---|---|
| 2020/0249604 | A1 | 8/2020 | Adachi et al. | |
| 2021/0157259 | A1 | 5/2021 | Inoue et al. | |
| 2021/0278790 | A1 | 9/2021 | Furuichi et al. | |
| 2021/0318655 | A1 | 10/2021 | Inoue et al. | |
| 2021/0364958 | A1 | 11/2021 | Someya et al. | |
| 2022/0283530 | A1 | 9/2022 | Adachi et al. | |
| 2022/0291610 | A1 | 9/2022 | Seki et al. | |
| 2022/0291615 | A1* | 9/2022 | Nanno | G03G 15/2057 |
| 2022/0357697 | A1 | 11/2022 | Furuichi | |
| 2022/0382191 | A1 | 12/2022 | Furuichi et al. | |
| 2023/0004108 | A1 | 1/2023 | Furuichi et al. | |
| 2023/0010218 | A1 | 1/2023 | Shoji et al. | |
| 2023/0110956 | A1 | 4/2023 | Furuichi | |
| 2024/0295842 | A1* | 9/2024 | Fujiwara | G03G 15/2017 |

* cited by examiner

FIXING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-043244, filed on Mar. 17, 2023, in the Japan Patent Office, the entire disclosure of which is hereby incorporated by reference herein.

BACKGROUND

Technical Field

Embodiments of the present disclosure relate to a fixing device and an image forming apparatus incorporating the fixing device.

Related Art

A fixing device mounted on an image forming apparatus is removable from the body of the image forming apparatus for, for example, clearing paper jam, the maintenance of parts in the fixing device, and the replacement of the fixing device.

An accident or malfunction may occur if a fixing device having input power supply voltage specifications different from the power supply voltage specifications of the image forming apparatus is erroneously mounted on the image forming apparatus.

A complicated configuration has been required to avoid, by electrical connection, unfavorable circumstances caused by the fixing device that is erroneously mounted on the image forming apparatus. To prevent an incompatible fixing device from being erroneously mounted on the image forming apparatus without such a complicated configuration, a component (mechanically incompatible component) may be employed to identify the compatibility of the fixing device.

In a known structure for identifying the compatibility of the fixing device, when an incompatible fixing device is inserted into the image forming apparatus, a component of the fixing device is not engaged with a component of the image forming apparatus. Thus, the incompatible fixing device is prevented from being erroneously mounted on the image forming apparatus. The components of the fixing device are disposed on a housing frame of the fixing device.

The housing frame of the fixing device typically includes plate-shaped members that surround the components of the fixing device from all sides. However, omitting a part of the housing frame has been proposed to reduce the weight, size, and cost of the fixing device.

SUMMARY

According to an embodiment of the present disclosure, a fixing device detachably attachable to an image forming apparatus includes a housing frame having an open front side in an insertion direction in which the fixing device is inserted into the image forming apparatus. The housing frame includes a support plate, as a back side of the housing frame in the insertion direction, and a pair of side plates extending in the insertion direction. The support plate includes an extension extending beyond one of the pair of side plates. The extension includes an engaged portion to be engaged with an engaging portion of the image forming apparatus when the fixing device is mounted on the image forming apparatus.

According to an embodiment of the present disclosure, an image forming apparatus includes the engaging portion and the fixing device described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
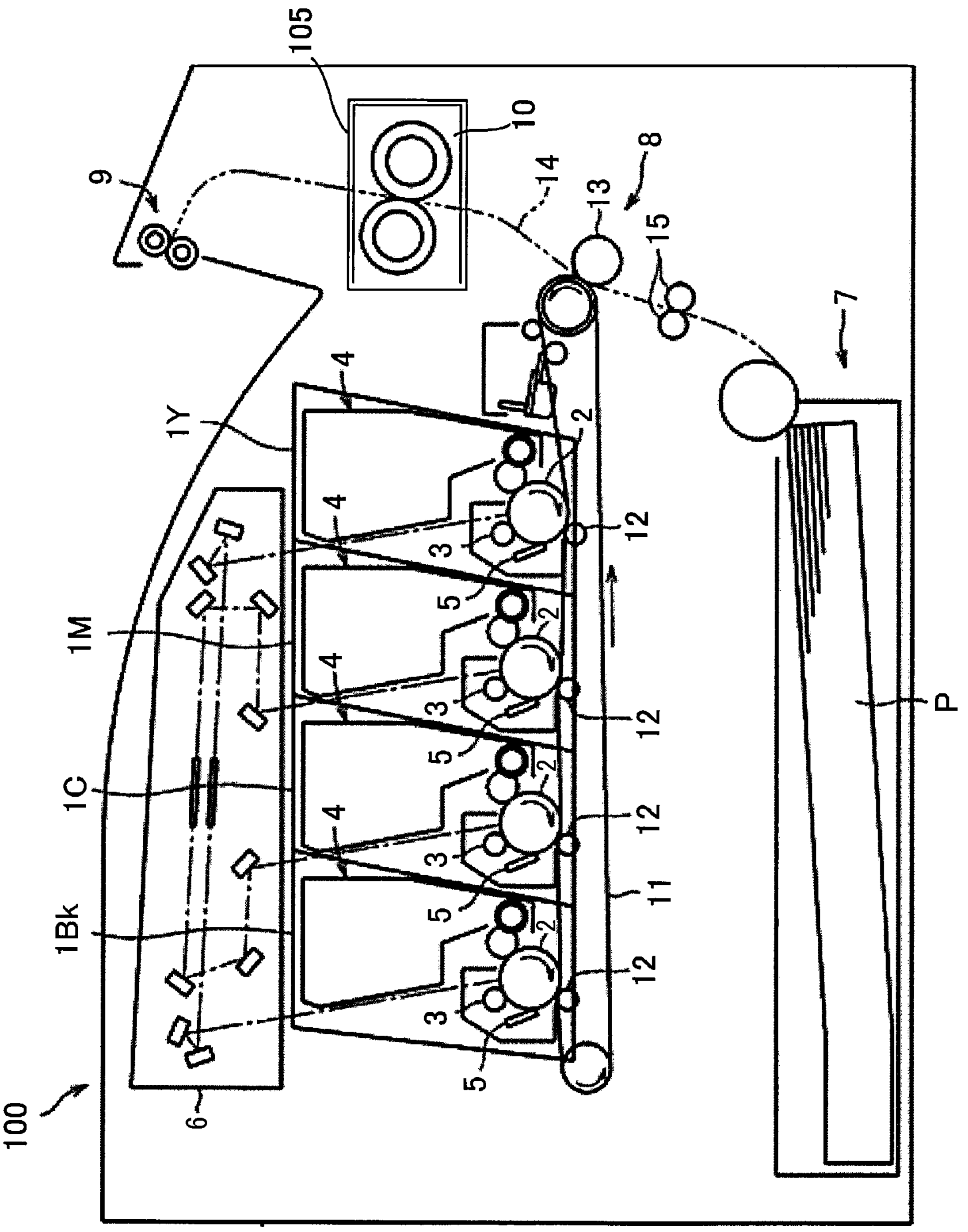
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below.

As used herein, the singular forms "a," "an," and "the" are intended to include the plural forms as well, unless the context clearly indicates otherwise.

For the sake of simplicity, like reference signs denote like elements such as parts and materials having the same functions, and redundant descriptions thereof are omitted unless otherwise required.

In the following description, suffixes Y, M, C, and Bk denote colors of yellow, magenta, cyan, and black, respectively. To simplify the description, these suffixes are omitted unless necessary.

As used herein, the term "connected/coupled" includes both direct connections and connections in which there are one or more intermediate connecting elements.

FIG. 1 is a schematic diagram illustrating a configuration of an image forming apparatus according to an embodiment of the present disclosure.

In the following description, the "image forming apparatus" may be a printer, a copier, a facsimile machine, or a multifunction peripheral having at least two of printing, copying, and facsimile functions. "Image formation" means the formation of images with meanings such as characters and figures and the formation of images with no meanings such as patterns.

Initially, with reference to FIG. 1, a description is given below of the overall configuration and operation of an image forming apparatus 100 according to the present embodiment.

The image forming apparatus 100 illustrated in FIG. 1 includes four image forming units 1Y, 1M, 1C, and 1Bk that are detachably attached to the body of the image forming apparatus 100. The image forming units 1Y, 1M, 1C, and 1Bk have substantially the same configuration except that the image forming units 1Y, 1M, 1C, and 1Bk contain developers of different colors, namely, yellow, magenta, cyan, and black, respectively. These colors of the developers correspond to the color separation components of a color image.

Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies toner as the developer to the surface of the photoconductor 2 to form a toner image. The cleaning device 5 cleans the surface of the photoconductor 2.

The image forming apparatus 100 includes an exposure device 6, a sheet feeding device 7, a transfer device 8, a fixing device 10 as a heating device, and an output device 9.

The exposure device 6 exposes the surface of each of the photoconductors 2 to form an electrostatic latent image on the surface of each of the photoconductors 2. The sheet feeding device 7 supplies a sheet P as a recording medium to a sheet conveyance passage 14. The transfer device 8 transfers, onto the sheet P, the toner images that have been formed on the photoconductors 2. The fixing device 10 fixes, to the surface of the sheet P, the toner images that have been transferred onto the sheet P. The output device 9 ejects the sheet P to the outside of the image forming apparatus 100.

For example, the image forming units 1Y, 1M, 1C, and 1Bk, the photoconductors 2, the charging devices 3, the exposure device 6, and the transfer device 8 serve as image forming means for forming an image on a sheet.

The image forming apparatus 100 includes a fixing-device housing 105 in which the fixing device 10 is detachably disposed.

The image forming apparatus 100 has a structure for identifying the compatibility of the fixing device 10. A specific aspect of identifying the compatibility will be described later.

The transfer device 8 includes an endless intermediate transfer belt 11 as an intermediate transferor, four primary transfer rollers 12 as primary transferors, and a secondary transfer roller 13 as a secondary transferor. The intermediate transfer belt 11 is stretched taut by a plurality of rollers. The primary transfer rollers 12 transfer the toner images from the photoconductors 2 onto the intermediate transfer belt 11. The secondary transfer roller 13 transfers the toner images from the intermediate transfer belt 11 onto the sheet P. The primary transfer rollers 12 contact the respective photoconductors 2 through the intermediate transfer belt 11. As a result, the intermediate transfer belt 11 and the photoconductors 2 contact each other and form primary transfer nips as areas of contact between the intermediate transfer belt 11 and the photoconductors 2. On the other hand, the secondary transfer roller 13 contacts, through the intermediate transfer belt 11, one of the plurality of rollers around which the intermediate transfer belt 11 is stretched taut. As a result, a secondary transfer nip is formed as an area of contact between the secondary transfer roller 13 and the intermediate transfer belt 11.

A timing roller pair 15 is disposed between the sheet feeding device 7 and the secondary transfer nip (at the secondary transfer roller 13) on the sheet conveyance passage 14.

With continued reference to FIG. 1, a description is given below of a series of printing operations performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. The exposure device 6 exposes the charged surface of each of the photoconductors 2 based on image information of a document read by a document reading device or print information instructed to be printed from a terminal. As a result, the electric potential at the exposed portion on the surface of each of the photoconductors 2 decreases. Thus, an electrostatic latent image is formed on the surface of each of the photoconductors 2. The developing device 4 supplies toner to the electrostatic latent image, rendering the electrostatic latent image visible as a toner image on each of the photoconductors 2.

The toner image formed on each of the photoconductors 2 reaches the primary transfer nip (at the corresponding primary transfer roller 12) in accordance with rotation of each of the photoconductors 2. The toner images are sequentially transferred and superimposed onto the intermediate transfer belt 11 that is driven to rotate counterclockwise in FIG. 1 to form a full-color toner image. The full-color toner image formed on the intermediate transfer belt 11 is conveyed to the secondary transfer nip (at the secondary transfer roller 13) in accordance with the rotation of the intermediate transfer belt 11. At the secondary transfer nip, the full-color toner image is transferred onto the sheet P that has been supplied and conveyed from the sheet feeding device 7. Specifically, the sheet P that has been supplied from the sheet feeding device 7 is temporarily stopped by the timing roller pair 15. The timing roller pair 15 then sends out the sheet P to the secondary transfer nip such that the sheet P meets the full-color toner image on the intermediate transfer belt 11 at the secondary transfer nip. Accordingly, the full-color toner image is transferred onto and borne on the sheet P. After the toner image is transferred from each of the photoconductors 2 onto the intermediate transfer belt 11, the cleaning device 5 removes from the corresponding photoconductor 2, residual toner that has failed to be transferred onto the intermediate transfer belt 11 and remains on the surface of the photoconductor 2.

The sheet P bearing the full-color toner image is conveyed to the fixing device 10, which fixes the full-color toner image onto the sheet P. The output device 9 then ejects the sheet P to the outside of the image forming apparatus 100. Thus, a series of printing operations is completed.

Examples of the recording medium on which an image is formed include, but are not limited to, the sheet P (plain paper), thick paper, a postcard, an envelope, thin paper, coated paper, art paper, tracing paper, an overhead projector (OHP) transparency, a plastic film, prepreg, and copper foil.

A description is given of a configuration of a fixing device to which the present disclosure is applied.

Figure 2:
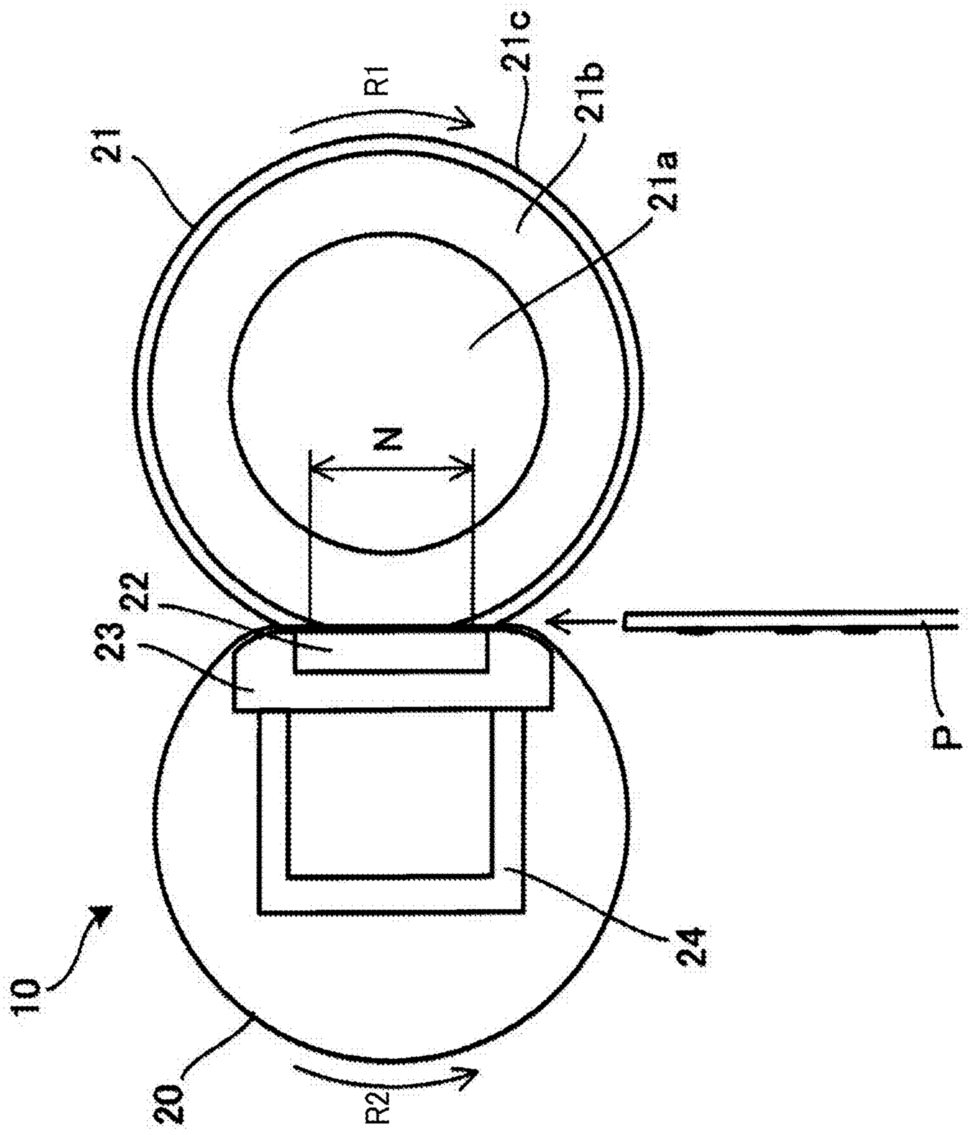
FIG. 2 is a schematic diagram illustrating a configuration of a fixing device incorporated in the image forming apparatus of FIG. 1.
Figure 3:
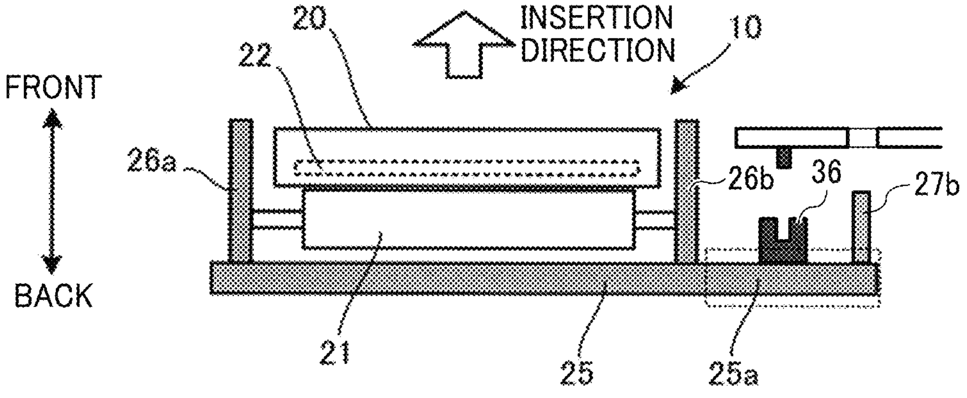
FIG. 3 is a diagram illustrating a configuration of a housing frame of the fixing device of FIG. 2 and a direction in which the fixing device is inserted into the image forming apparatus of FIG. 1.

FIG. 2 is a schematic side view of the fixing device 10 according to the present embodiment. FIG. 3 is a diagram illustrating a configuration of a housing frame of the fixing device 10 and an insertion direction in which the fixing device 10 is inserted into the image forming apparatus 100 according to the present embodiment.

As illustrated in FIG. 2, the fixing device 10 according to the present embodiment includes a fixing belt 20, a heater 22, a heater holder 23, a stay 24, and a pressure roller 21. The fixing belt 20 is a rotatable endless belt serving as a fixing member. The heater 22 heats the fixing belt 20. The heater holder 23 holds the heater 22. The stay 24 is disposed inside a loop formed by the fixing belt 20 to support the heater holder 23. The pressure roller 21 contacts an outer circumferential surface of the fixing belt 20 to form a fixing nip N as an area of contact between the fixing belt 20 and the pressure roller 21.

A direction orthogonal to the surface of the paper on which FIG. 2 is drawn is a longitudinal direction of, for example, the fixing belt 20, the pressure roller 21, the heater 22, the heater holder 23, and the stay 24 and may be referred to simply as the longitudinal direction in the following description. The longitudinal direction is also a width direction of the sheet P to be conveyed, a width direction of the fixing belt 20, and an axial direction of the pressure roller 21.

The fixing belt 20 includes a tubular base layer and a release layer. The base layer is made of polyimide (PI) and has an outer diameter of 25 mm and a thickness in a range of from 40 μm to 120 μm, for example. The release layer, as an outermost layer of the fixing belt 20, is made of fluororesin such as tetrafluoroethylene-perfluoroalkylvinylether copolymer (PFA) or polytetrafluoroethylene (PTFE) and has a thickness in a range of from 5 μm to 50 μm to enhance the durability of the fixing belt 20 and facilitate the separation of the sheet P and a foreign substance from the fixing belt 20. Optionally, an elastic layer that is made of, for example, rubber and has a thickness in a range of from 50 μm to 500 μm may be interposed between the base layer and the release layer. The base layer of the fixing belt 20 is not limited to polyimide. Alternatively, the base layer of the fixing belt 20 may be made of heat-resistant resin such as polyether ether ketone (PEEK) or metal such as nickel (Ni) or steel use stainless (SUS). The inner circumferential surface of the fixing belt 20 may be coated with, for example, PI or PTFE as a slide layer.

The pressure roller 21 has an outer diameter of, for example, 25 mm. The pressure roller 21 includes a core 21*a*, an elastic layer 21*b*, and a release layer 21*c*. The core 21*a* is a solid core made of iron. The elastic layer 21*b* rests on a circumferential surface of the core 21*a*. The release layer 21*c* rests on an outer circumferential surface of the elastic layer 21*b*. The elastic layer 21*b* is made of silicone rubber and has a thickness of, for example, 3.5 mm. Preferably, the release layer 21*c* that is made of fluororesin and has a thickness of, for example, about 40 μm rests on the outer circumferential surface of the elastic layer 21*b* to facilitate the separation of the sheet P and the foreign substance from the pressure roller 21. The pressure roller 21 is urged toward the fixing belt 20 by urging means and pressed against the heater 22 through the fixing belt 20. As a result, the fixing nip N is formed between the fixing belt 20 and the pressure roller 21. The pressure roller 21 is driven to rotate by a driver. As the pressure roller 21 rotates in a direction R1, which is indicated by arrow R1 in FIG. 2, the fixing belt 20 rotates in a direction R2, which is indicated by arrow R2 in FIG. 2.

The heater 22 extends throughout an entire width of the fixing belt 20. In other words, the longitudinal direction of the heater 22 is parallel to the width direction of the fixing belt 20. The heater 22 is disposed to contact the inner circumferential surface of the fixing belt 20. Alternatively, the heater 22 may not contact the fixing belt 20 or may contact the fixing belt 20 indirectly through, for example, a low friction sheet. However, the heater 22 that directly contacts the fixing belt 20 increases the efficiency of heat conduction from the heater 22 to the fixing belt 20. Alternatively, the heater 22 may contact the outer circumferential surface of the fixing belt 20. However, if the outer circumferential surface of the fixing belt 20 is brought into contact with the heater 22 and damaged, the fixing belt 20 may degrade the quality of fixing the toner image on the sheet P. For this reason, preferably, the heater 22 contacts the inner circumferential surface of the fixing belt 20.

The heater holder 23 and the stay 24 are disposed inside the loop formed by the fixing belt 20. The stay 24 is made of a metal channel member and has opposed longitudinal ends supported by side plates 26*a* and 26*b*. The heater holder 23 has a stay-side face and a heater-side face opposite to the stay-side face. The stay-side face faces the stay 24 whereas the heater-side face faces the heater 22. The stay 24 supports the stay-side face of the heater holder 23 to retain the heater 22 and the heater holder 23 to be immune from being bent substantially by pressure from the pressure roller 21. Accordingly, the fixing nip N is formed between the fixing belt 20 and the pressure roller 21.

The heater holder 23 is likely to be heated to a high temperature by the heat from the heater 22. For this reason, preferably, the heater holder 23 is made of a heat-resistant material. For example, when the heater holder 23 is made of a heat-resistant resin having a decreased thermal conductivity such as liquid crystal polymer (LCP) or PEEK, the heater holder 23 reduces the heat conduction from the heater 22 to the heater holder 23. Accordingly, the heater 22 can efficiently heat the fixing belt 20.

When the series of printing operations starts, the pressure roller 21 is driven to rotate. The fixing belt 20 starts rotation in accordance with the rotation of the pressure roller 21. As power is supplied to the heater 22, the heater 22 heats the fixing belt 20. When the sheet P bearing an unfixed toner image reaches the fixing nip N between the fixing belt 20 and the pressure roller 21 as illustrated in FIG. 2 with the temperature of the fixing belt 20 reaching a predetermined target temperature (fixing temperature), the unfixed toner image is fixed onto the sheet P under heat and pressure.

As illustrated in FIG. 3, the housing frame of the fixing device 10 according to the present embodiment includes a support plate 25, as the back side of the housing frame in the insertion direction in which the fixing device 10 is inserted into the image forming apparatus 100, and a pair of side plates, side plates 26*a* and 26*b*, extending in the insertion direction. Since the housing frame of the fixing device 10 has no support plate as the front side of the housing frame in the insertion direction, the front side of the housing frame is open. The support plate 25 has an extension 25*a* extending beyond the side plate 26*b*.

The fixing belt 20 is disposed ahead in the insertion direction, whereas the pressure roller 21 is disposed behind in the insertion direction.

Figure 6A:
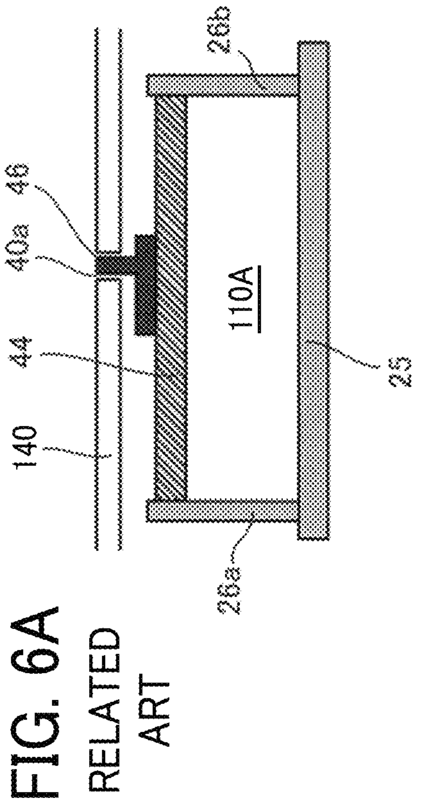
FIG. 6A RELATED ART
FIGS. 6A and 6B are diagrams each illustrating a configuration of a housing frame of a comparative fixing device.
Figure 6B:
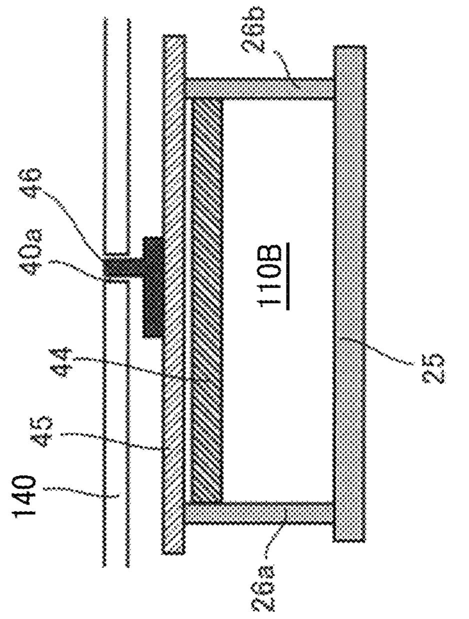
FIG. 6B RELATED ART

FIG. 6A is a diagram illustrating a housing frame of a comparative fixing device 110A, which is mounted on an image forming apparatus. FIG. 6B is a diagram illustrating a housing frame of a comparative fixing device 110B, which is mounted on an image forming apparatus.

In the comparative example illustrated in FIG. 6A, the housing frame includes plate-shaped members that surround the components of the fixing device 110A from all sides. The housing frame of the fixing device 110A includes a frame member 44, which is omitted in the housing frame of the fixing device 10 of the present embodiment, at the front side of the housing frame in the insertion direction. The frame member 44 is provided with a member including an engaged projection 46 that is engaged with an engaging recess 40*a* of a housing support plate 140, which corresponds to a housing support plate 40 of the fixing-device housing 105 of the image forming apparatus 100.

In the comparative example illustrated in FIG. 6B, the housing frame includes a cover 45 in addition to plate-shaped members that surround the components of the fixing device 110B from all sides. The cover 45 is provided with a member including the engaged projection 46 that is engaged with the engaging recess 40*a* of the housing support plate 140.

The engaging recess 40*a* and the engaged projection 46 serve as engagement identifiers for identifying the compatibility of the fixing devices 110A and 110B by engagement. The engaging recess 40*a* and the engaged projection 46 are engaged with each other when the fixing devices 110A and 110B are compatible with the image forming apparatus. By contrast, the engaging recess 40*a* and the engaged projection 46 are not engaged with each other when the fixing devices 110A and 110B are incompatible with the image forming apparatus.

The fixing device 10 according to the present embodiment illustrated in FIG. 3 does not have the engaged projection 46 illustrated in each of FIGS. 6A and 6B because the fixing device 10 does not include the frame member 44 or the cover 45.

On the other hand, the fixing device 10 according to the present embodiment includes the extension 25*a* of the support plate 25 provided with the engagement identifier. Specifically, the fixing device 10 includes, in the extension

25*a*, an engaged portion as the engagement identifier. By contrast, the image forming apparatus 100 includes an engaging portion for identifying the compatibility of the fixing device 10. When the fixing device 10 is mounted on the image forming apparatus 100, the engaged portion of the fixing device 10 is engaged with the engaging portion of the image forming apparatus 100.

A description is given below of the aspect of the engagement identifier.

Figure 4:
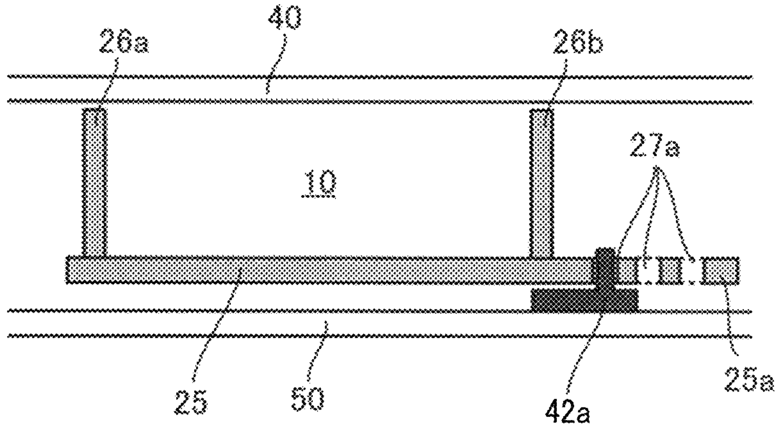
FIG. 4 is a diagram illustrating a configuration of a fixing device according to an embodiment of the present disclosure.

The fixing device 10 illustrated in FIG. 4 includes an engaged portion 27*a* in the extension 25*a*. On the other hand, the image forming apparatus 100 includes, on a body cover 50, an engaging portion 42*a* for identifying the compatibility of the fixing device 10. The engaged portion 27*a* of the fixing device 10 is engaged with the engaging portion 42*a* of the image forming apparatus 100.

The engaging portion 42*a* is a member having a projection.

The engaged portion 27*a* has a recess that is engaged with the projection of the engaging portion 42*a* or a through hole that fits with the projection of the engaging portion 42*a*. The recess or the through hole may be referred to simply as the recess in the following description.

FIG. 4 illustrates an example in which the engaged portion 27*a* includes a plurality of recesses. However, the number of recesses is not particularly limited provided that the number of recesses is equal to or greater than the number of projections of the engaging portion 42*a*. Although the number of projections of the engaging portion 42*a* is not particularly limited, the number of projections of the engaging portion 42*a* is preferably one, two, or three.

When the compatible fixing device 10 is inserted into the fixing-device housing 105 of the image forming apparatus 100 and the body cover 50 is pressed, the projection of the engaging portion 42*a* is engaged with the recess of the engaged portion 27*a* as illustrated in FIG. 4 so that the body cover 50 is properly closed.

An incompatible fixing device may not include the engaged portion 27*a* or may include the engaged portion 27*a* that is not provided at a position corresponding to the position of the engaging portion 42*a*, for example.

When an incompatible fixing device is inserted into the fixing-device housing 105 and the body cover 50 is pressed, the projection of the engaging portion 42*a* of the image forming apparatus 100 interferes with the support plate 25 of the incompatible fixing device and therefore the body cover 50 is not closed.

In the example of FIG. 4, the engaging portion 42*a* is engaged with the engaged portion 27*a* and the body cover 50 is properly closed. Accordingly, the compatibility of the fixing device 10 is identified.

Figure 5:
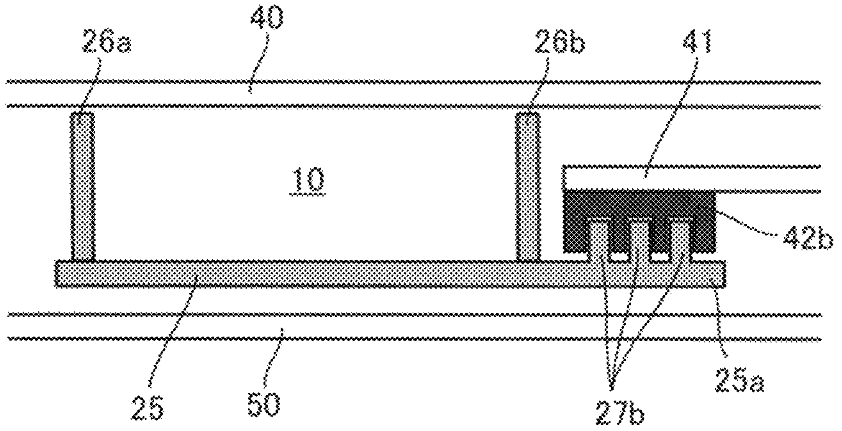
FIG. 5 is a diagram illustrating a configuration of a fixing device according to an embodiment of the present disclosure.

The fixing device 10 illustrated in FIG. 5 includes an engaged portion 27*b* in the extension 25*a*. On the other hand, the image forming apparatus 100 includes, on a body frame 41, an engaging portion 42*b* for identifying the compatibility of the fixing device 10. The engaged portion 27*b* of the fixing device 10 is engaged with the engaging portion 42*b* of the image forming apparatus 100.

The engaging portion 42*b* is a member having a recess.

The engaged portion 27*b* has a projection that is engaged with the recess of the engaging portion 42*b*.

FIG. 5 illustrates an example in which the engaged portion 27*b* includes a plurality of projections. However, the number of projections is not particularly limited provided that the number of projections is equal to or smaller than the number of recesses of the engaging portion 42*b*. Although the number of recesses of the engaging portion 42*b* is not particularly limited, the number of recesses of the engaging portion 42*b* is preferably one, two, or three.

For example, the projection may be formed by bending the support plate 25.

When the compatible fixing device 10 is inserted into the fixing-device housing 105 of the image forming apparatus 100, the projection of the engaged portion 27*b* is engaged with the recess of the engaging portion 42*b* as illustrated in FIG. 5 so that the fixing device 10 is properly set.

An incompatible fixing device may not include the engaged portion 27*b* or may include the engaged portion 27*b* that is not provided at a position corresponding to the position of the engaging portion 42*b*, for example. When such an incompatible fixing device is inserted into the fixing-device housing 105, the incompatible fixing device fails to be set at the correct position.

In the example of FIG. 5, the engaging portion 42*b* is engaged with the engaged portion 27*b* and thus the fixing device 10 is set at the correct position. Accordingly, the compatibility of the fixing device 10 is identified.

As illustrated in FIGS. 4 and 5, the fixing device 10 according to the present embodiment omits the frame member 44 and the cover 45, which are relatively large members each serving as a longitudinal one side of the housing frame. Thus, the fixing device 10 is reduced in size, weight, and cost of parts. Without the frame member 44 or the cover 45, an incompatible fixing device is prevented from being erroneously mounted on the image forming apparatus 100.

The engagement identifier has an engagement structure and may include detecting means capable of electrically detecting the engagement state between the fixing device and the image forming apparatus. Such a configuration enhances the accuracy with which the compatibility of the fixing device is identified.

A description is given below of an example in which the engagement identifier includes the detecting means.

Figure 7A:
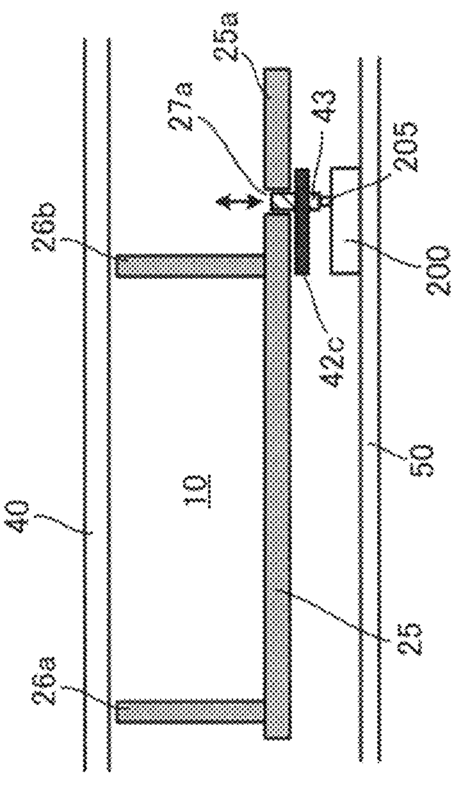
FIG. 7A is a diagram illustrating a configuration of a fixing device according to an embodiment of the present disclosure.

The fixing device 10 illustrated in FIG. 7A includes the engaged portion 27*a* in the extension 25*a*. On the other hand, the body cover 50 of the image forming apparatus 100 is provided with an engaging portion 42*c* for identifying the compatibility of the fixing device 10. The engaged portion 27*a* of the fixing device 10 is engaged with the engaging portion 42*c* of the image forming apparatus 100.

The engaging portion 42*c* is provided with a movable projection 43 that can reciprocate. The movable projection 43 serves as a reciprocating pin according to the present embodiment.

The engaged portion 27*a* is a recess that is engaged with the movable projection 43 of the engaging portion 42*c* or a through hole that fits with the movable projection 43. The recess or the through hole may be referred to simply as the recess in the following description.

FIG. 7A illustrates an example in which the engaged portion 27*a* includes one recess. However, the number of recesses is not particularly limited provided that the number of recesses is equal to or greater than the number of movable projection 43. Although the number of movable projection 43 is not particularly limited, the number of movable projection 43 is preferably one, two, or three.

The engaging portion 42*c* is provided with the detecting means for detecting the engagement state. The detecting means is, for example, a push switch 200.

When the fixing device 10 is mounted on the image forming apparatus 100, the engaged portion 27*a* of the extension 25*a* is engaged with the movable projection 43 of the engaging portion 42*c* and the push switch 200 as the detecting means is activated.

The push switch 200 is disposed on the body cover 50 together with the engaging portion 42*c*. The push switch 200 may be disposed inside the fixing-device housing 105 as in the example illustrated in FIG. 7A or outside the fixing-device housing 105. When the push switch 200 is disposed outside, the movable projection 43 reciprocates through the cover.

Figure 7B:
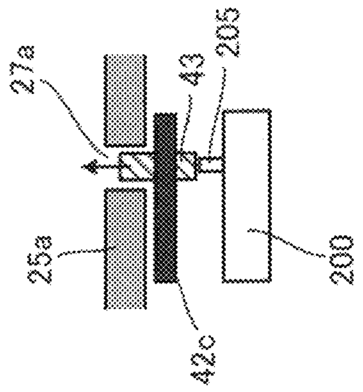
FIG. 7B is a partially enlarged view of the fixing device of FIG. 7A.
Figure 7C:
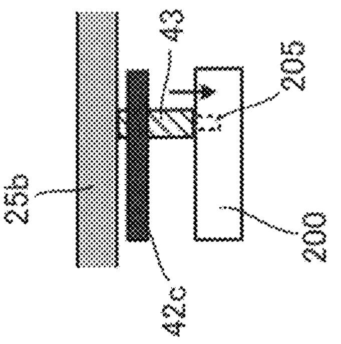
FIG. 7C is a partially enlarged view of a fixing device according to a comparative example.

FIG. 7B is a partially enlarged view of the engagement identifier included in the fixing device 10 of FIG. 7A. FIG. 7C is a partially enlarged view of the engagement identifier included in a fixing device according to a comparative example.

As illustrated in FIG. 7B, when the compatible fixing device 10 is inserted into the fixing-device housing 105 of the image forming apparatus 100 and the body cover 50 is pressed, the movable projection 43 of the engaging portion 42*c* is engaged with the recess of the engaged portion 27*a*. When the movable projection 43 moves upward in FIG. 7B, a push pin 205 of the push switch 200 is not pressed.

As illustrated in the partially enlarged view of FIG. 7C, when an incompatible fixing device is inserted into the fixing-device housing 105 of the image forming apparatus 100 and the body cover 50 is pressed, the movable projection 43 of the engaging portion 42*c* interferes with an extension 25*b* of the support plate 25 and moves downward in FIG. 7C. As a result, the push pin 205 of the push switch 200 is pressed.

When the compatible fixing device 10 is inserted and incorrectly set, the movable projection 43 of the engaging portion 42*c* moves downward as described above with reference to FIG. 7C and the push pin 205 of the push switch 200 is pressed.

In the present embodiment, in a case where the push switch 200 is set to be off (a non-conductive state) when the push switch 200 is not pressed and to be on (a (conductive state) when the push switch 200 is pressed, the non-conductive state of the push switch 200 indicates that the compatible fixing device 10 is mounted on the image forming apparatus 100 whereas the conductive state of the push switch 200 indicates that an incompatible fixing device is mounted on the image forming apparatus 100 or that the compatible fixing device 10 is incorrectly set in the image forming apparatus 100.

By contrast, in the present embodiment, in a case where the push switch 200 is set to be on (the conductive state) when the push switch 200 is not pressed and to be off (the non-conductive state) when the push switch 200 is pressed, the conductive state of the push switch 200 indicates that the compatible fixing device 10 is mounted on the image forming apparatus 100 whereas the non-conductive state of the push switch 200 indicates that an incompatible fixing device is mounted on the image forming apparatus 100 or that the compatible fixing device 10 is incorrectly set in the image forming apparatus 100.

Figure 8A:
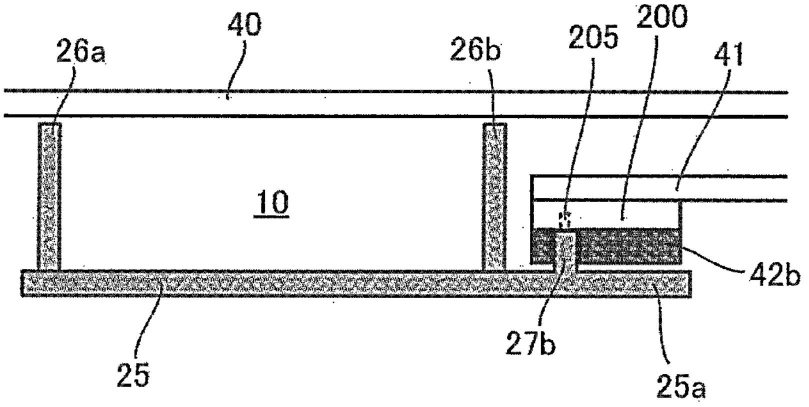
FIG. 8A is a diagram illustrating a configuration of a fixing device according to an embodiment of the present disclosure.

The fixing device 10 illustrated in FIG. 8A includes the engaged portion 27*b* in the extension 25*a*. On the other hand, the body frame 41 of the image forming apparatus 100 is provided with the engaging portion 42*b* for identifying the compatibility of the fixing device 10. The engaged portion 27*b* of the fixing device 10 is engaged with the engaging portion 42*b* of the image forming apparatus 100.

The engaging portion 42*b* is a member having a recess.

The engaged portion 27*b* has a projection that is engaged with the recess of the engaging portion 42*a*.

FIG. 8A illustrates an example in which the engaged portion 27*b* includes one projection. However, the number of projections is not particularly limited provided that the number of projections is equal to or smaller than the number of recesses of the engaging portion 42*b*. Although the number of recesses of the engaging portion 42*b* is not particularly limited, the number of recesses of the engaging portion 42*b* is preferably one, two, or three.

The engaging portion 42*b* is provided with the detecting means for detecting the engagement state. The detecting means is, for example, the push switch 200.

When the fixing device 10 is mounted on the image forming apparatus 100, the engaged portion 27*b* of the extension 25*a* is engaged with the recess of the engaging portion 42*b* and the push switch 200 as the detecting means is activated.

Figure 8B:
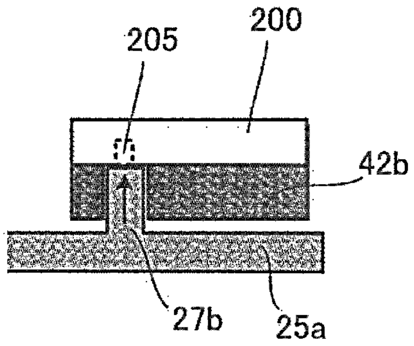
FIG. 8B is a partially enlarged view of the fixing device of FIG. 8A.

As illustrated in the partially enlarged view of FIG. 8B, when the compatible fixing device 10 is inserted into the fixing-device housing 105 of the image forming apparatus 100, the projection of the engaged portion 27*b* is engaged with the recess of the engaging portion 42*b* so that the fixing device 10 is properly set. As a result, the push pin 205 of the push switch 200 is pressed.

Figure 8C:
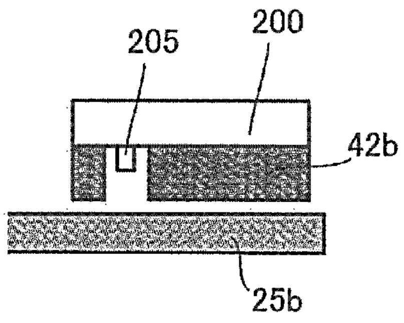
FIG. 8C is a partially enlarged view of a fixing device according to a comparative example.

As illustrated in the partially enlarged view of FIG. 8C, when an incompatible fixing device is inserted into the fixing-device housing 105 of the image forming apparatus 100, no projection is engaged with the recess of the engaging portion 42*b* and therefore the push pin 205 of the push switch 200 is not pressed.

When the compatible fixing device 10 is inserted and incorrectly set, the projection of the engaged portion 27*b* is not engaged with the recess of the engaging portion 42*b* and therefore the push pin 205 of the push switch 200 is not pressed.

In the present embodiment, in a case where the push switch 200 is set to be off (the non-conductive state) when the push switch 200 is not pressed and to be on (the conductive state) when the push switch 200 is pressed, the conductive state of the push switch 200 indicates that the compatible fixing device 10 is mounted on the image forming apparatus 100 whereas the non-conductive state of the push switch 200 indicates that an incompatible fixing device is mounted on the image forming apparatus 100 or that the compatible fixing device 10 is incorrectly set in the image forming apparatus 100.

By contrast, in the present embodiment, in a case where the push switch 200 is set to be on (the conductive state) when the push switch 200 is not pressed and to be off (the non-conductive state) when the push switch 200 is pressed, the non-conductive state of the push switch 200 indicates that the compatible fixing device 10 is mounted on the image forming apparatus 100 whereas the conductive state of the push switch 200 indicates that an incompatible fixing device is mounted on the image forming apparatus 100 or that the compatible fixing device 10 is incorrectly set in the image forming apparatus 100.

Preferably, the image forming apparatus 100 includes means for notifying the user of the detection result by the electric signal of the push switch 200. Such a configuration enhances the accuracy with which the engagement state is ascertained and reliably prevents a fixing device from being erroneously mounted on an image forming apparatus.

Figure 9A:
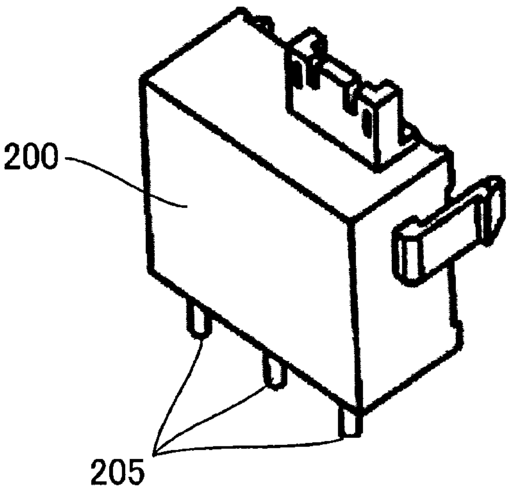
FIG. 9A is a diagram illustrating a push switch as detecting means according to an embodiment of the present disclosure.
Figure 9B:
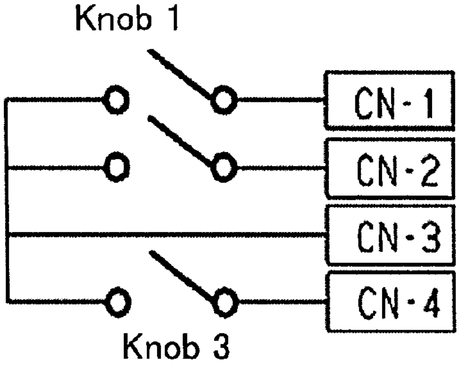
FIG. 9B is a circuit diagram of the push switch of FIG. 9A.

FIG. 9A is an external perspective view of the push switch 200 according to the present embodiment. FIG. 9B is a circuit diagram of the push switch 200 of FIG. 9A. In FIG. 9B, CN-1, CN-2, CN-3, and CN-4 are connectors of the push switch 200.

Although the push switch 200 illustrated in FIG. 9A includes a plurality of push pins 205, the number of push pins 205 is not limited to the number illustrated in FIG. 9A.

The number of push pins 205 can be selected as appropriate for the structure of the engagement identifier.

For example, when the push pins 205 are pressed, the circuit illustrated in FIG. 9B is closed and generates electric signals.

As described above, the push switch 200 may be set to be off (the non-conductive state) when the push switch 200 is not pressed and to be on (the conductive state) when the push switch 200 is pressed. Alternatively, the push switch 200 may be set to be on (the conductive state) when the push switch 200 is not pressed and to be off (the non-conductive state) when the push switch 200 is pressed.

As illustrated in FIG. 3, the fixing device according to the present embodiment may include, in the extension 25*a*, a connector 36 that is electrically connected to the image forming apparatus 100 when the fixing device is mounted on the image forming apparatus 100.

When the fixing device is erroneously mounted on or incorrectly set in the image forming apparatus 100, the connector 36 disposed near the engaged portion 27*a* or 27*b* is not connected.

The fixing device according to the present embodiment and the image forming apparatus including the fixing device are reduced in size, weight, and cost, and prevents the fixing device from being erroneously mounted on the image forming apparatus.

The above-described configuration is also applicable to a fixing device and an image forming apparatus according to embodiments different from the above embodiment.

A description is given below of several other embodiments of the present disclosure. Examples of the heater 22 and the heater holder 23 included in the fixing device 10 will also be described.

Figure 10:
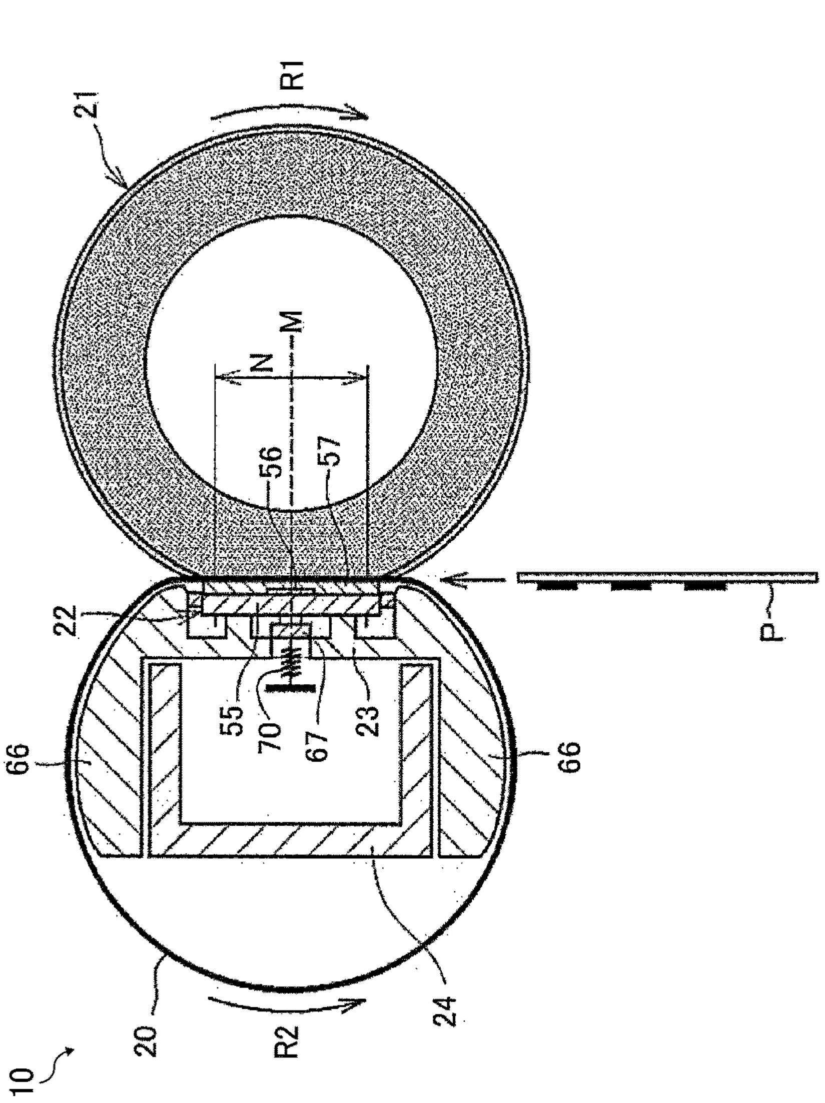
FIG. 10 is a diagram illustrating a configuration of a fixing device according to an embodiment different from the above embodiments of the present disclosure.

The fixing device 10 illustrated in FIG. 10 includes, as a heat source, a planar or plate-shaped heater 22 that includes a base 55 and resistive heat generators 56 on the base 55. The base 55 is made of a material having heat resistance and insulation properties, such as ceramic such as alumina or aluminum nitride, glass, mica, or polyimide. The base 55 may be a metal material such as stainless steel, iron, or aluminum on which an insulation layer rests. For example, the resistive heat generators 56 are formed by coating the surface of the base 55 with a paste of a mixture of silver-palladium (AgPd) and glass powder by screen printing and thereafter firing the coated base 55. The resistive heat generators 56 are covered with an insulation layer 57. The insulation layer 57 is made of a material such as heat-resistant glass, ceramic, or polyimide.

Figure 11:
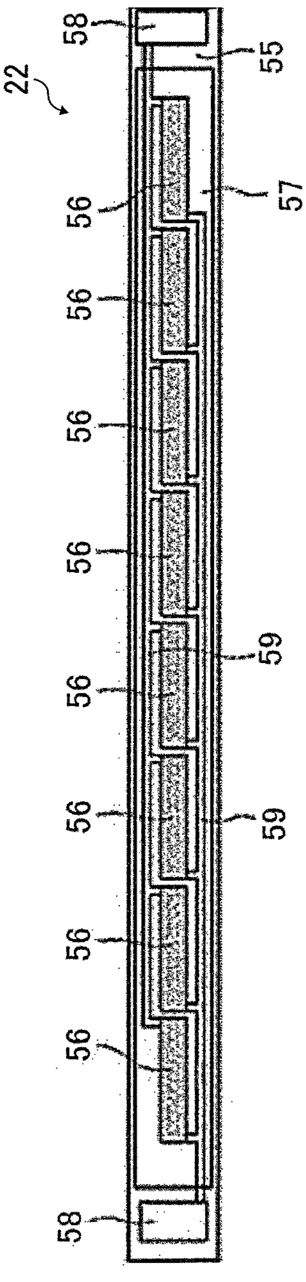
FIG. 11 is a plan view of a heater included in the fixing device of FIG. 10.

As illustrated in FIG. 11, the heater 22 is shaped like a rectangular plate. The heater 22 is disposed such that the longitudinal direction of the heater 22 is parallel to the longitudinal direction of the fixing belt 20. The resistive heat generators 56 are disposed at intervals in the longitudinal direction of the base 55 (the heater 22). A plurality of electrodes 58 and a plurality of power supply lines 59 are disposed on the surface of the base 55 provided with the resistive heat generators 56. The electrodes 58 are disposed at opposed longitudinal end portions of the base 55. The resistive heat generators 56 are connected in parallel to the electrodes 58 through the power supply lines 59. The resistive heat generators 56 and the power supply lines 59 are covered with the insulation layer 57. On the other hand, the electrodes 58 are not covered with the insulation layer 57 and thus exposed so that a connector as a power supply terminal can be connected.

As illustrated in FIG. 10, the heater 22 is held by the heater holder 23 and is disposed to contact the inner circumferential surface of the fixing belt 20. For this reason, when the heater 22 generates heat, the fixing belt 20 is heated from the inside of the loop formed by the fixing belt 20.

The fixing belt 20 illustrated in FIG. 10 and the fixing belt 20 according to the above embodiment have substantially the same configurations. The pressure roller 21 illustrated in FIG. 10 and the pressure roller 21 according to the above embodiment have substantially the same configurations.

The heater holder 23 is integrated with guides 66. The guides 66 are located upstream and downstream from the fixing nip N in the direction R2 in which the fixing belt 20 rotates. When the fixing belt 20 rotates, the guides 66 in contact with the inner circumferential surface of the fixing belt 20 guide the fixing belt 20 from the inside of the loop formed by the fixing belt 20.

A temperature sensor 67, as a temperature detector for detecting the temperature of the heater 22, is disposed inside the loop formed by the fixing belt 20. The temperature sensor 67 is pressed by a spring 70.

The temperature sensor 67 illustrated in FIG. 10 is a contact temperature sensor that is disposed in contact with the surface of the heater 22 on the opposite side to the fixing nip N to detect the temperature. Alternatively, the temperature sensor 67 may be a non-contact temperature sensor that is disposed in non-contact with the heater 22 to detect the ambient temperature near the heater 22.

In the fixing device 10, the resistive heat generators 56 generate heat when electric power is supplied to the heater 22 from a power source that is disposed in the body of the image forming apparatus 100. As a result, the fixing belt 20 is heated. The amount of heat to be generated by the heater 22 is controlled based on the temperature of the heater 22 detected by the temperature sensor 67 to maintain the temperature of the fixing belt 20 at the predetermined temperature (i.e., the fixing temperature). In this state, as illustrated in FIG. 10, when the sheet P bearing unfixed toner enters the fixing nip N between the fixing belt 20 and the pressure roller 21, the unfixed toner on the sheet P is pressed and heated. As a result, the toner image is fixed onto the sheet P.

Figure 12:
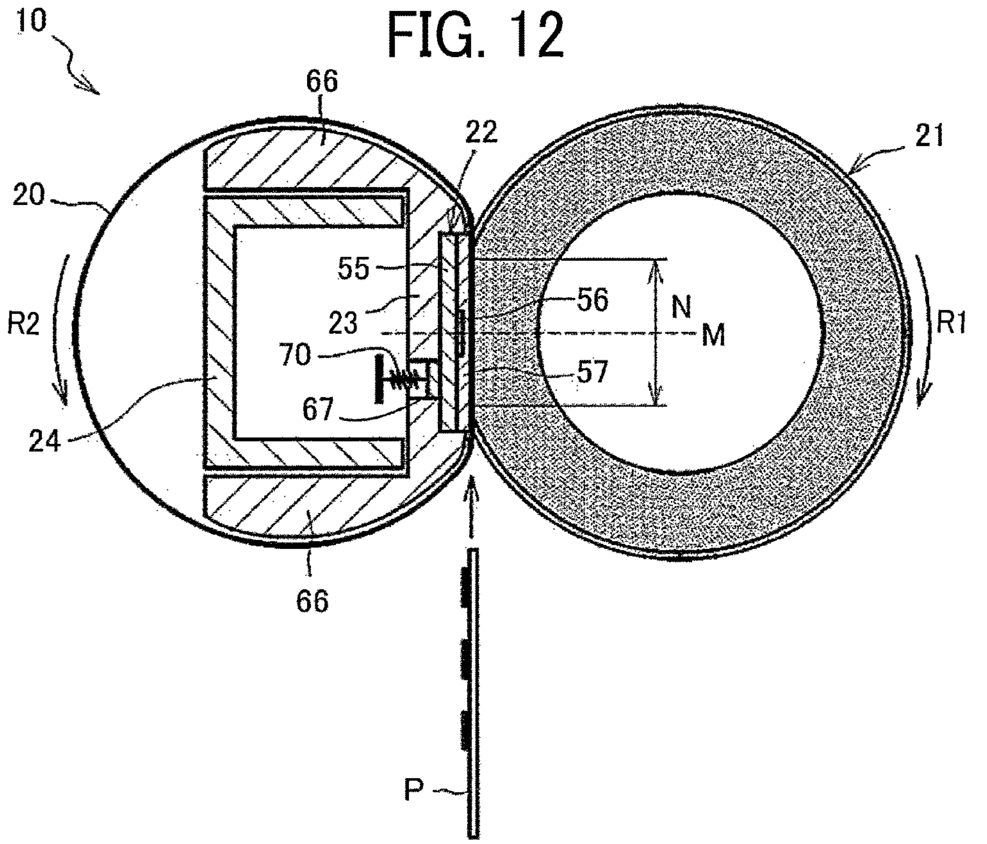
FIG. 12 is a diagram illustrating a configuration of a fixing device according to an embodiment different from the above embodiments of the present disclosure.

In the embodiment illustrated in FIG. 10, the temperature sensor 67 is disposed at a position corresponding to a center M of the fixing nip N in a sheet conveyance direction in which the sheet P is conveyed. Alternatively, the temperature sensor 67 may be disposed upstream from the center M of the fixing nip N in the sheet conveyance direction as in the embodiment illustrated in FIG. 12. In other words, the temperature sensor 67 may be disposed near the entrance of the fixing nip N. The entrance of the fixing nip N is in an area where the heat of the fixing belt 20 is particularly easily taken away by the sheet P entering the fixing nip N. The temperature sensor 67 detects the temperature around the entrance of the fixing nip N to secure the fixability of the image and effectively reduce the occurrence of the fixing offset, which is caused when the toner image is insufficiently heated.

Figure 13:
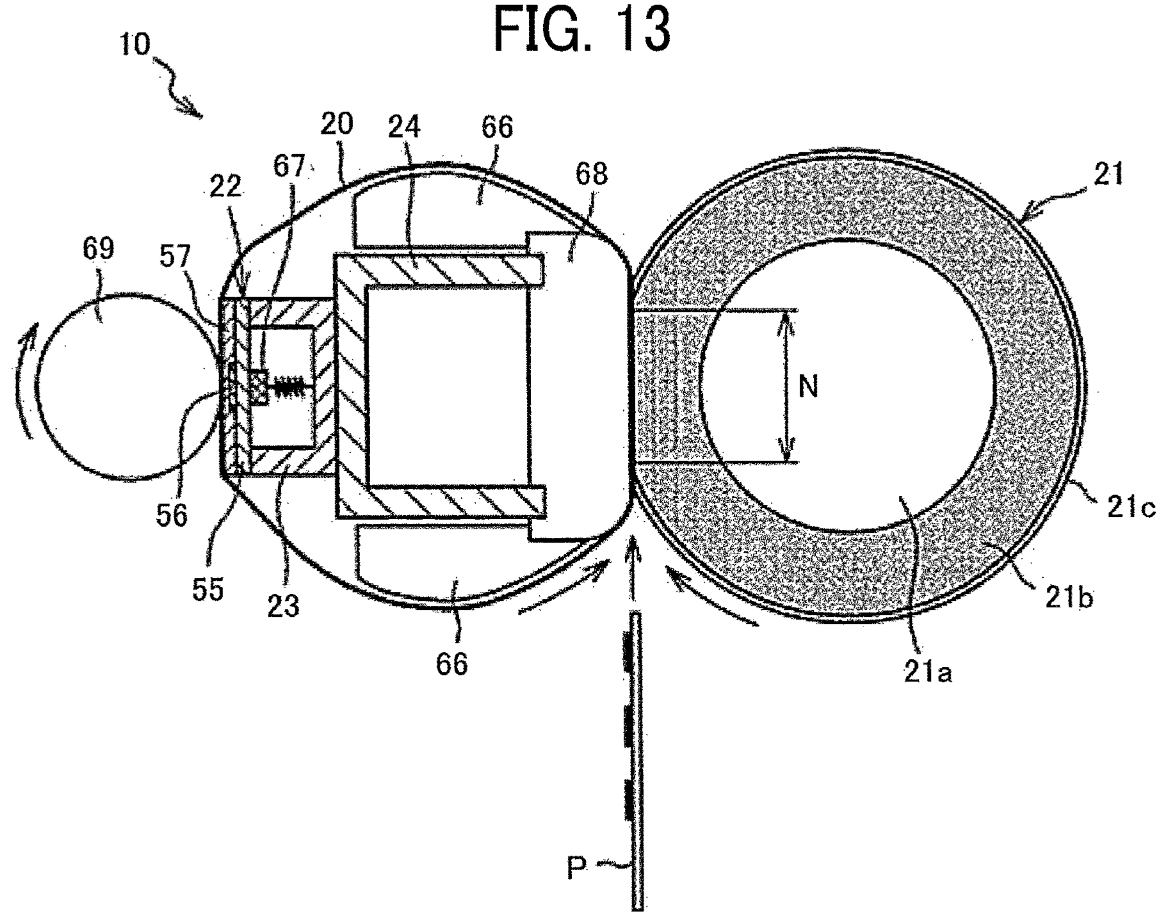
FIG. 13 is a diagram illustrating a configuration of a fixing device according to an embodiment different from the above embodiments of the present disclosure.

The fixing device 10 illustrated in FIG. 13 includes a pressure roller 69 opposite the pressure roller 21 across the fixing belt 20. The pressure roller 69 is an opposed rotator that is disposed opposite the fixing belt 20 as a rotator and rotates. The heater 22 sandwiches the fixing belt 20 with the pressure roller 69 to heat the fixing belt 20. On the other hand, a nip former 68 is disposed inside the loop formed by the fixing belt 20 and opposite the pressure roller 21. The nip former 68 is held by the stay 24. The nip former 68 sandwiches the fixing belt 20 with the pressure roller 21 to form the fixing nip N.

Figure 14:
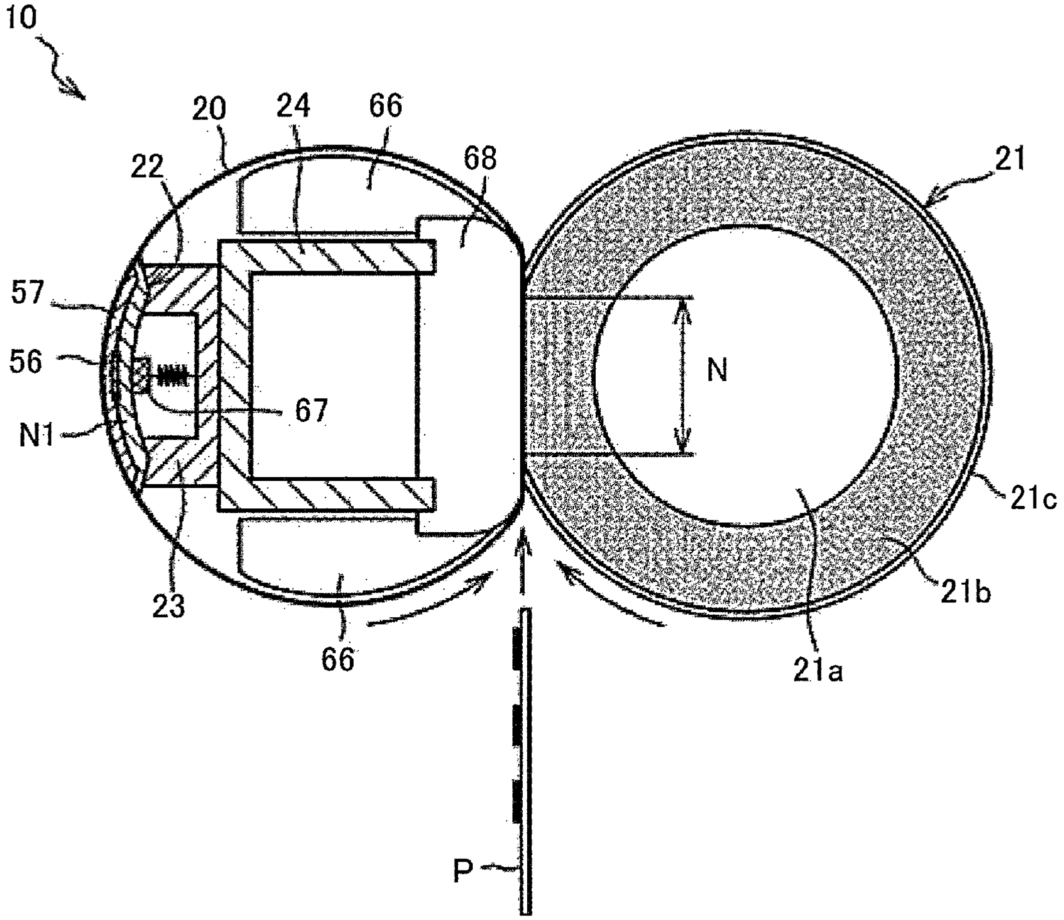
FIG. 14 is a diagram illustrating a configuration of a fixing device according to an embodiment different from the above embodiments of the present disclosure.

The fixing device 10 illustrated in FIG. 14 does not include the pressure roller 69 described above. To attain a contact length N1 for which the heater 22 contacts the fixing belt 20 in the circumferential direction of the fixing belt 20, the heater 22 is curved into an arc conforming to the curvature of the fixing belt 20. The rest of the configuration of the fixing device 10 is substantially the same as the rest of the configuration of the fixing device 10 illustrated in FIG. 13.

Figure 15:
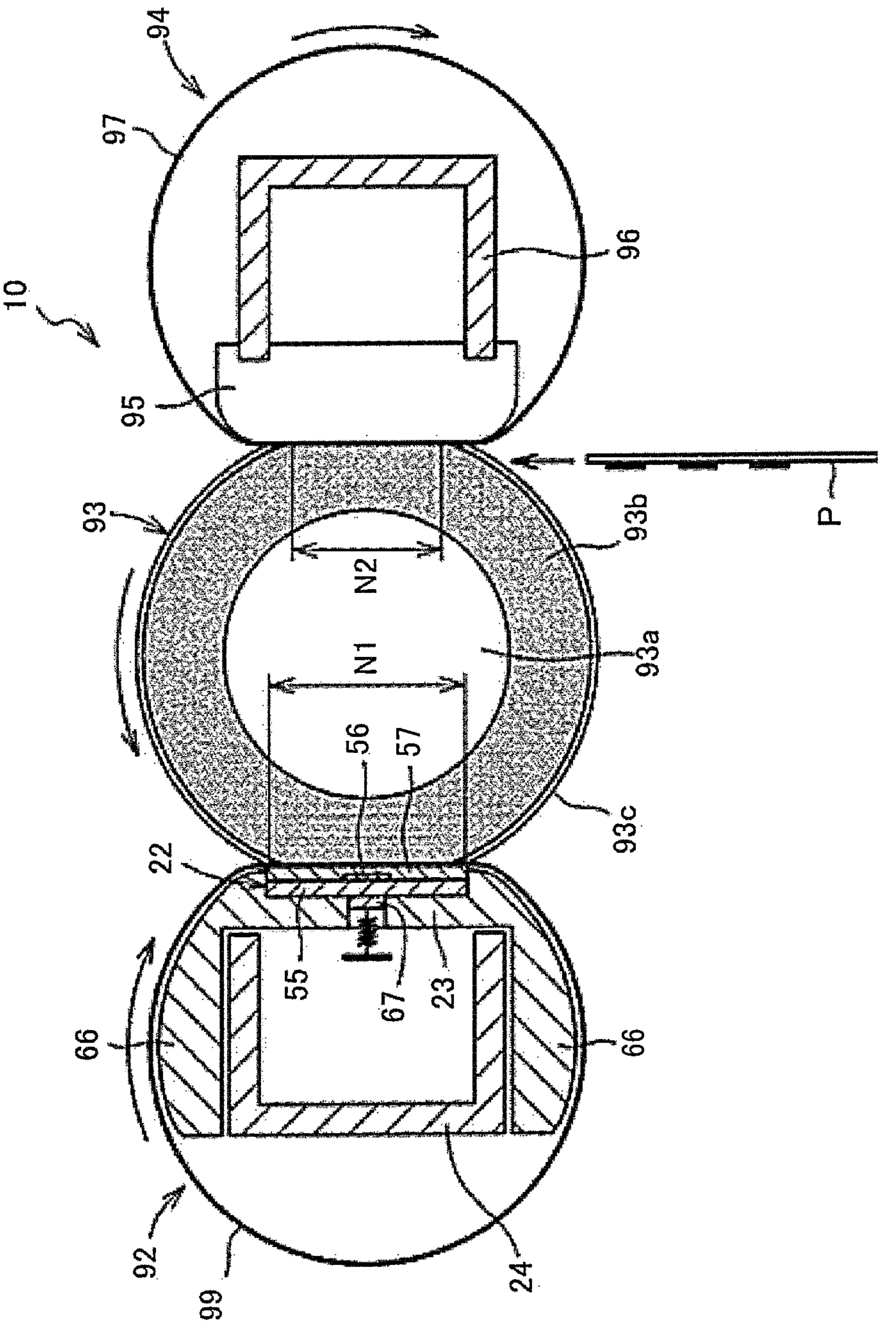
FIG. 15 is a diagram illustrating a configuration of a fixing device according to an embodiment different from the above embodiments of the present disclosure.

The fixing device 10 illustrated in FIG. 15 includes a heating assembly 92, a fixing roller 93 as a fixing member, and a pressure assembly 94 as an opposed member. The heating assembly 92 includes the heater 22, the heater holder 23, and the stay 24, which are described in the above embodiment, and a heating belt 99 as a rotator. The fixing roller 93 is an opposed rotator that is disposed opposite the heating belt 99 as a rotator and rotates. The fixing roller 93 includes a core 93*a*, an elastic layer 93*b*, and a release layer 93*c*. The core 93*a* is a solid core made of iron. The elastic layer 93*b* rests on a circumferential surface of the core 93*a*. The release layer 93*c* rests on an outer circumferential surface of the elastic layer 93*b*. The pressure assembly 94 is disposed opposite the heating assembly 92 across the fixing roller 93. The pressure assembly 94 includes a nip former 95, a stay 96, and a rotatable pressure belt 97 enclosing the nip former 95 and the stay 96. When the sheet P bearing a toner image is conveyed through a fixing nip N2 between the pressure belt 97 and the fixing roller 93, the toner image is fixed onto the sheet P under heat and pressure.

The image forming apparatus according to the embodiments of the present disclosure is not limited to the color image forming apparatus illustrated in FIG. 1. Alternatively, the image forming apparatus may be a monochrome image forming apparatus that forms monochrome images on recording media. The image forming apparatus may be, for example, a copier, a printer, a facsimile machine, or a multifunction peripheral (MFP) having at least two of copying, printing, scanning, and facsimile functions.

Figure 16:
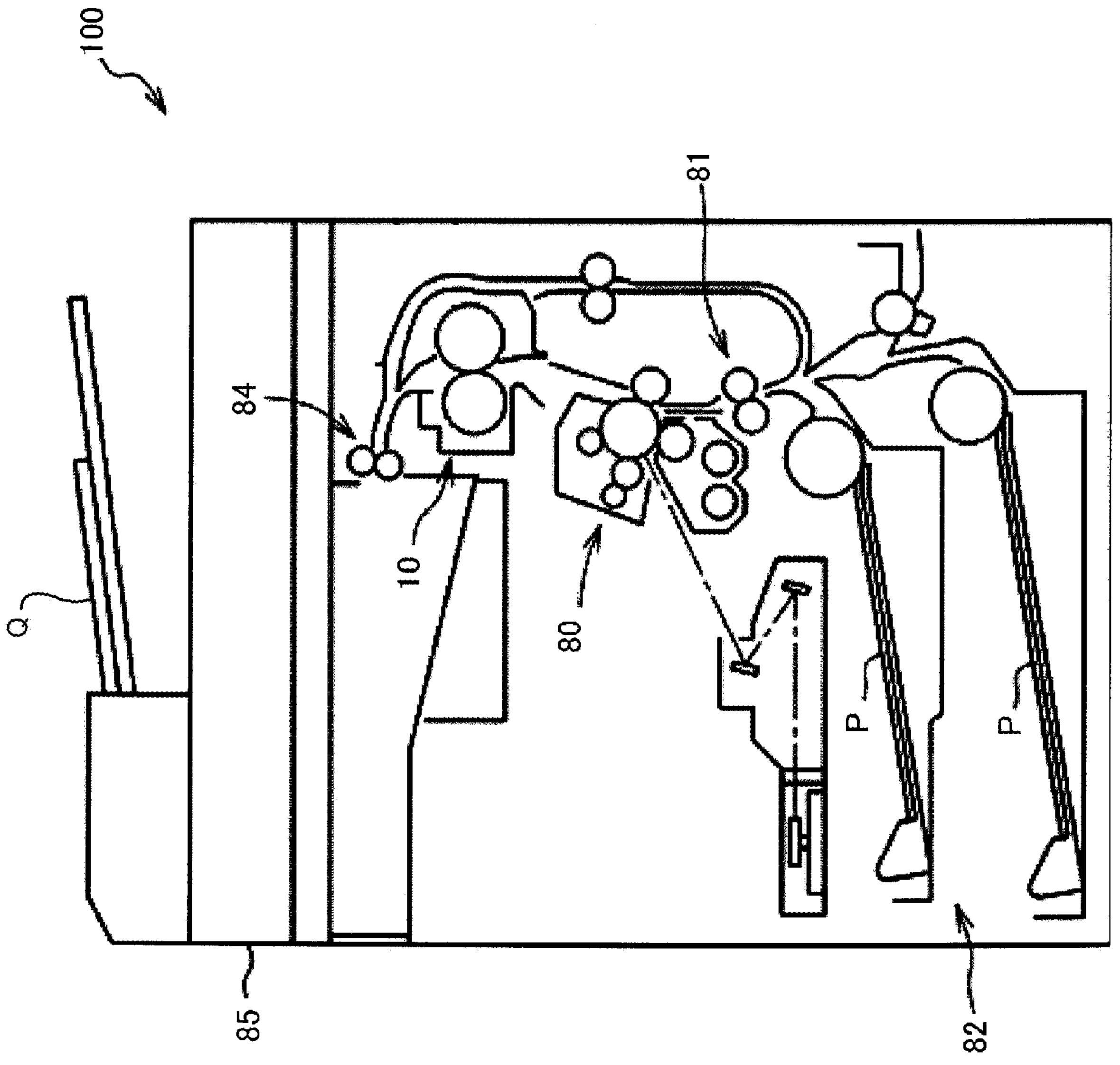
FIG. 16 is a diagram illustrating a configuration of an image forming apparatus according to an embodiment different from the above embodiments of the present disclosure.

For example, the present disclosure is applicable to an image forming apparatus having a configuration as illustrated in FIG. 16.

The image forming apparatus 100 illustrated in FIG. 16 includes an image forming unit 80, a sheet conveying unit, a sheet feeding device 82, the fixing device 10, an output device 84, and a reading unit 85. The image forming unit 80 includes, for example, a photoconductive drum. The sheet conveying unit includes, for example, a timing roller pair 81. The sheet feeding device 82 includes a plurality of input trays, which accommodate sheets of different sizes.

The reading unit 85 reads an image of a document Q. The reading unit 85 generates image data from the read image. The sheet feeding device 82 accommodates a plurality of sheets P and feeds the sheets P to the conveyance passage. The timing roller pair 81 conveys the sheet P on the conveyance passage to the image forming unit 80.

The image forming unit 80 forms a toner image on the sheet P. Specifically, the image forming unit 80 includes a photoconductive drum, a charging roller, an exposure device, a developing device, a replenishing device, a transfer roller, a cleaning device, and a charge neutralizer. The toner image indicates, for example, the image of the document Q.

The fixing device 10 fixes the toner image onto the sheet P under heat and pressure. The sheet P bearing the fixed toner image is conveyed to the output device 84 by, for example, a conveyance roller. The output device 84 ejects the sheet P to the outside of the image forming apparatus 100.

A description is given below of the fixing device 10 according to the present embodiment. Redundant descriptions of configurations common to the configurations of the fixing device according to the above embodiments are omitted unless otherwise required.

Figure 17:
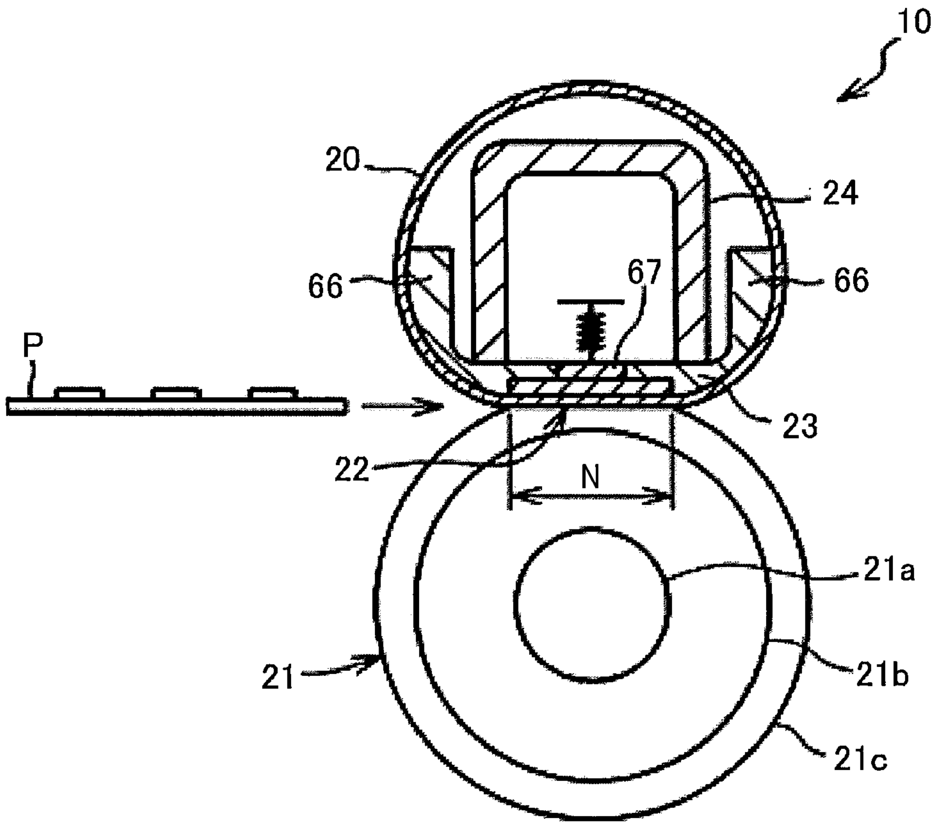
FIG. 17 is a diagram illustrating a configuration of a fixing device included in the image forming apparatus of FIG. 16.

As illustrated in FIG. 17, the fixing device 10 includes, for example, the fixing belt 20, the pressure roller 21, the heater 22, the heater holder 23, the stay 24, and the temperature sensor 67.

The fixing nip N is formed between the fixing belt 20 and the pressure roller 21. The fixing nip N has a nip length of 10 mm in the sheet conveyance direction. The fixing device 10 has a linear velocity of 240 mm/s.

The fixing belt 20 includes a polyimide base and a release layer. The fixing belt 20 does not include an elastic layer. The release layer is made of a heat-resistant film material that is made of, for example, a fluororesin. The fixing belt 20 has an outer diameter of about 24 mm.

The pressure roller 21 includes the core 21*a*, the elastic layer 21*b*, and the release layer 21*c*. The pressure roller 21 has an outer diameter in a range of from 24 mm to 30 mm. The elastic layer 21*b* has a thickness in a range of from 3 mm to 4 mm.

The heater 22 includes a base, a heat insulation layer, a conductive layer including, for example, a resistive heat generator, and an insulation layer. The heater 22 has a total thickness of about 1 mm. The heater 22 has a width Y of 13 mm in an array intersecting direction, which is a direction intersecting the array direction of the heater 22.

Figure 18:
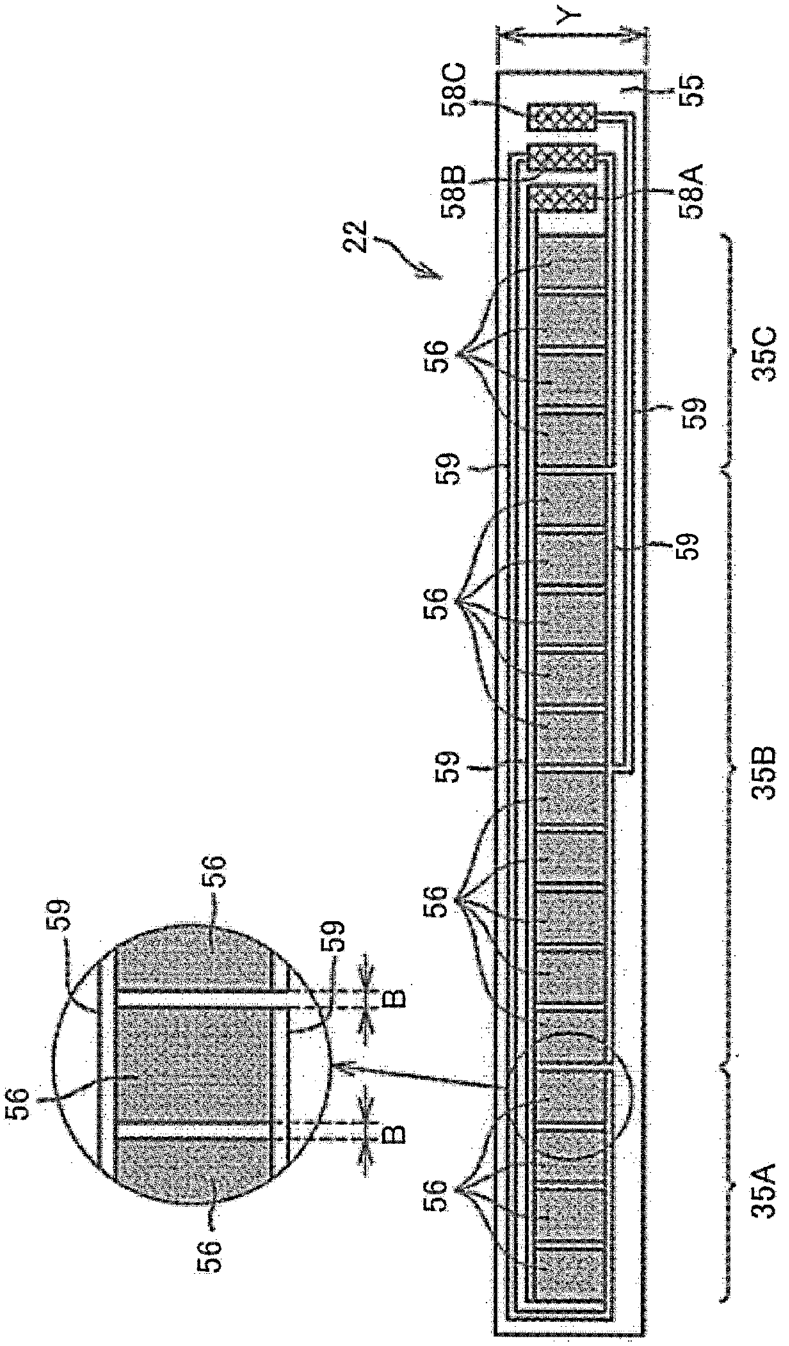
FIG. 18 is a plan view of a heater included in the fixing device of FIG. 17.

As illustrated in FIG. 18, the conductive layer of the heater 22 includes the resistive heat generators 56, the power supply lines 59, and electrodes 58A to 58C. In the present embodiment, as illustrated in the enlarged view of FIG. 18, division areas B separate the resistive heat generators 56 in an array direction. Although the division areas B are illustrated only in the range of the enlarged view of FIG. 18, the division areas B are formed between adjacent resistive heat generators of all the resistive heat generators 56 in actual. The resistive heat generators 56 constitute three heat generation units 35A to 35C. The heat generation units 35A and 35C generate heat when the electrodes 58A and 58B are energized. The heat generation unit 35B generates heat when the electrodes 58A and 58C are energized. For example, when a toner image is fixed on a small sheet, the heat generation unit 35B generates heat. By contrast, when a toner image is fixed on a large sheet, all the heat generation units 35A to 35C generate heat.

Figure 19:
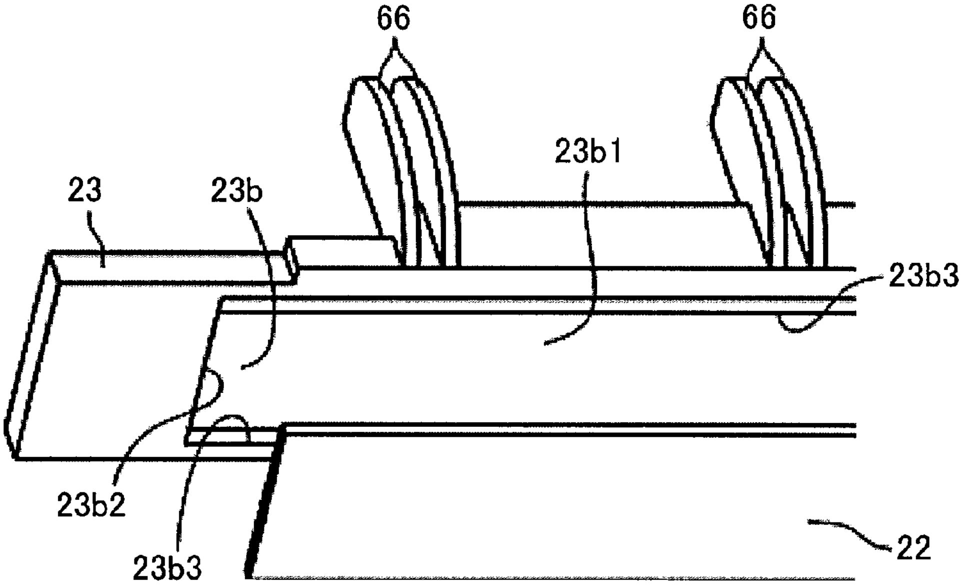
FIG. 19 is a perspective view of a heater and a heater holder included in the fixing device of FIG. 17.

As illustrated in FIG. 19, the heater holder 23 includes a recess 23*b* to accommodate and hold the heater 22. The heater holder 23 has a heater side facing the heater 22. The heater holder 23 has the recess 23*b* at the heater side. The recess 23*b* includes a bottom face 23*b*1, a pair of side wall faces 23*b*2, and a pair of side wall faces 23*b*3. The bottom face 23*b*1 is a rectangular (oblong) surface having substantially the same size as the heater 22. The pair of side wall faces 23*b*2 and the pair of side wall faces 23*b*3 constitute four walls intersecting with the bottom face 23*b*1 along four sides that form the outer contour of the bottom face 23*b*1. The pair of side wall faces 23*b*2 is provided in the direction intersecting a longitudinal direction of the heater 22. The longitudinal direction is parallel to the array direction in which the resistive heat generators 56 are arrayed. One of the pair of side wall faces 23*b*2 may be omitted to open the recess 23*b* at one end portion in the longitudinal direction of the heater 22.

Figure 20:
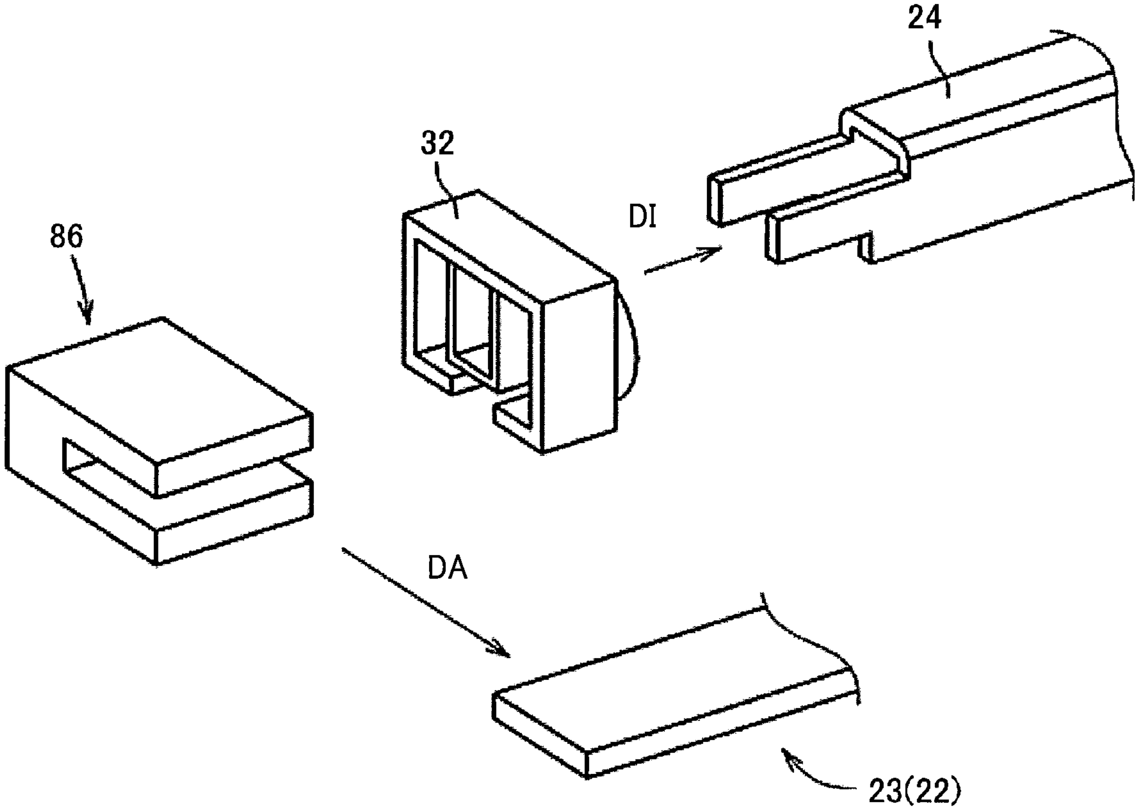
FIG. 20 is a perspective view of a connector to be attached to a heater and a flange to be inserted into a stay, according to an embodiment of the present disclosure.

As illustrated in FIG. 20, the heater 22 and the heater holder 23 are held by a connector 86. The connector 86 includes a housing made of resin such as liquid crystal polymer (LCP) and a plurality of contact terminals disposed in the housing.

The connector 86 is attached to the heater 22 and the heater holder 23 so as to sandwich the heater 22 and the heater holder 23 together from the front and back sides. In this state, when the contact terminals are brought into contact (pressure contact) with the electrodes of the heater 22, the heat generating portion of the heater 22 and the power source of the image forming apparatus 100 are electrically connected through the connector 86. Thus, the power supply is ready to supply power to the heat generating portion of the heater 22.

A flange 32 is inserted into each end of the stay 24 in a direction DI as illustrated in FIG. 20 to hold each end of the fixing belt 20 from the inside of the loop formed by the fixing belt 20.

The connector 86 is attached to the heater 22 and the heater holder 23 in a direction DA as illustrated in FIG. 20. The direction DA is parallel to the array intersecting direction of the heater 22. When the connector 86 is attached to the heater holder 23, a projection of one of the connector 86 and the heater holder 23 may be engaged with a recess of the other one of the connector 86 and the heater holder 23 to be movable relative to the recess. The connector 86 is attached to the heater 22 and the heater holder 23 on one side in the array direction, which is opposite to the side provided with the drive motor of the pressure roller 21.

Figure 21A:
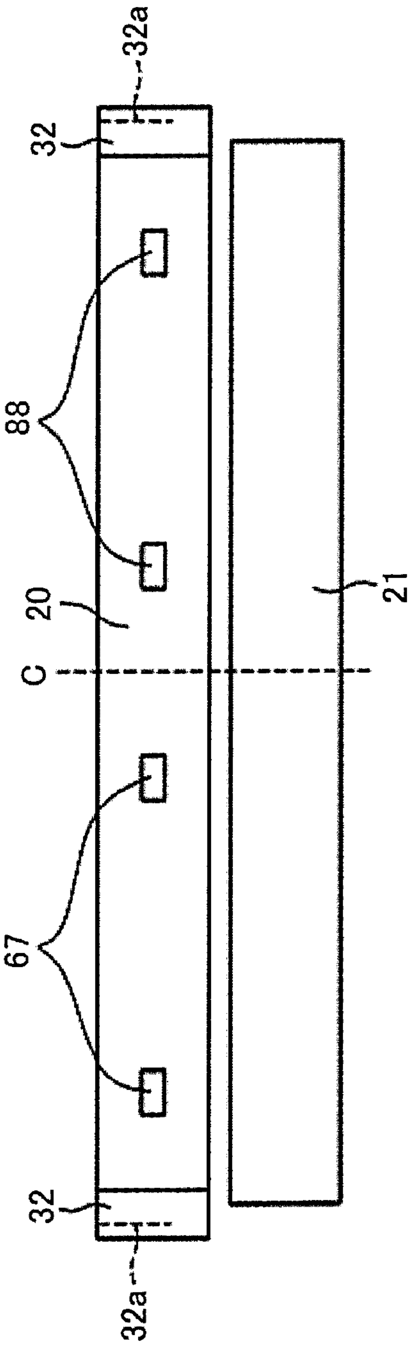
FIG. 21A is a diagram illustrating the arrangement of a temperature sensor pair and a thermostat pair included in the fixing device of FIG. 17.

FIG. 21A is a diagram illustrating the arrangement of the temperature sensor (temperature sensor pair) 67 and a thermostat pair 88 serving as a pair of power disconnectors according to the present embodiment.

As illustrated in FIG. 21A, the temperature sensor pair 67 faces the inner circumferential surface of the fixing belt 20 at a position adjacent to a longitudinal center C of the fixing belt 20 and a position adjacent to a longitudinal end of the fixing belt 20. One sensor of the temperature sensor pair 67 is disposed at a position corresponding to the division area B (see FIG. 18) between the resistive heat generators 56 of the heater 22.

The thermostat pair 88 as the pair of power disconnectors faces the inner circumferential surface of the fixing belt 20 at a position adjacent to the longitudinal center C of the fixing belt 20 and a position adjacent to another longitudinal end of the fixing belt 20. Thermostat pair 88 detects the temperature of the inner circumferential surface of the fixing belt 20 or the ambient temperature near the inner circumferential surface of the fixing belt 20. When the temperature detected by the thermostat pair 88 exceeds a preset threshold, the power supply to the heater 22 is interrupted.

Figure 21B:
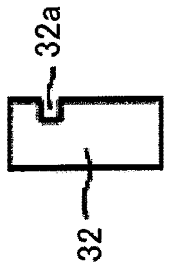
FIG. 21B is a diagram illustrating a recess of the flange of FIG. 20A.

As illustrated in FIGS. 21A and 21B, each of the flanges 32 that hold each end of the fixing belt 20 is provided with a guide groove 32*a*. The guide groove 32*a* extends in a direction in which the fixing belt 20 contacts or is separated from the pressure roller 21. The guide groove 32*a* is engaged with the side plate 26*a*/26*b* of the housing frame of the fixing device 10. The relative movement of the engaging portion of the side plate 26*a*/26*b* in the guide groove 32*a* allows the fixing belt 20 to move in the direction in which the fixing belt 20 contacts the pressure roller 21 and the direction in which the fixing belt 20 is separated from the pressure roller 21.

The present disclosure is also applicable to a fixing device with the following configuration.

Figure 22:
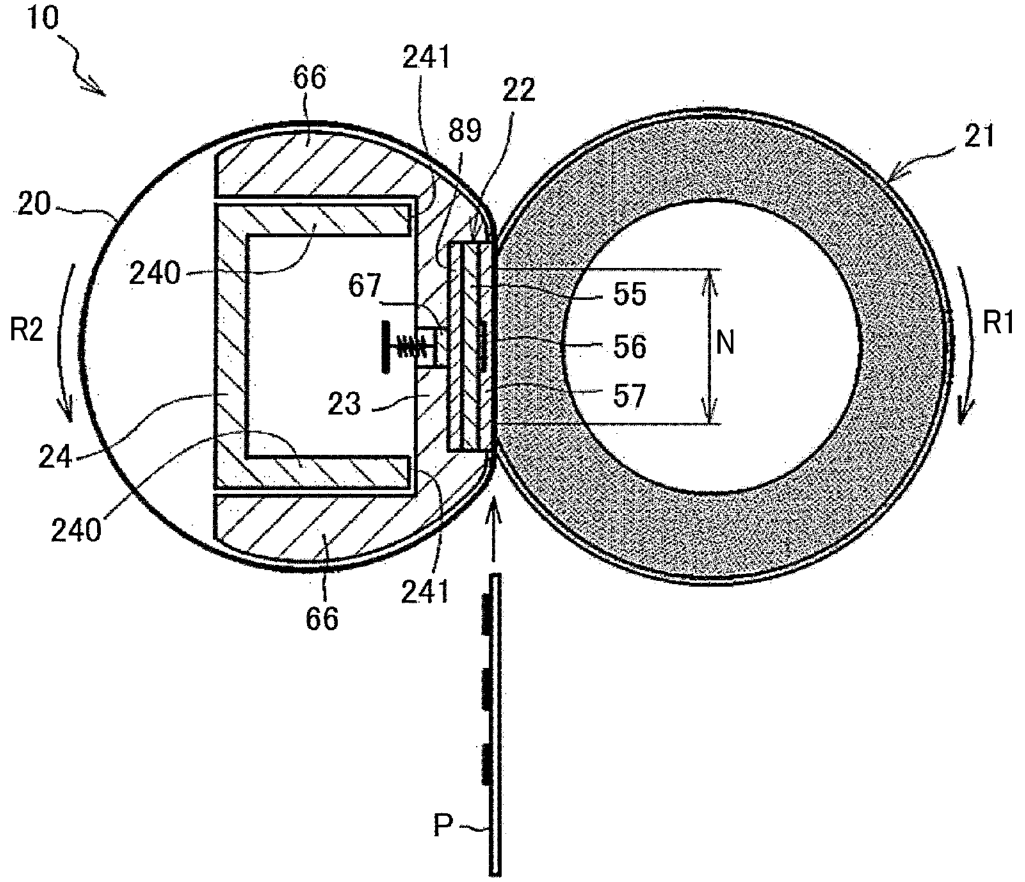
FIG. 22 is a diagram illustrating a configuration of a fixing device according to an embodiment different from the above embodiments of the present disclosure.

FIG. 22 is a schematic diagram illustrating a configuration of the fixing device 10 according to another embodiment of the present disclosure.

As illustrated in FIG. 22, the fixing device 10 according to the present embodiment includes the fixing belt 20 as a rotator or a fixing member, the pressure roller 21 as an opposed rotator or a pressure member, the heater 22 as a heating source, the heater holder 23 as a heating-source holder, the stay 24 as a flange, the temperature sensor 67 as a temperature detector, and a first high thermal conductor 89. The temperature sensor 67 is a thermistor according to the present embodiment. The temperature sensor 67 detects the temperature of the first high thermal conductor 89.

The stay 24 includes two vertical portions 240 extending in the thickness direction of, for example, the heater 22. Each of the vertical portions 240 includes a contact face 241. The stay 24 holds the heater holder 23, the first high thermal conductor 89, and the heater 22 with the contact faces 241 in contact with the heater holder 23. In the array intersecting direction (i.e., the vertical direction in FIG. 22), the contact faces 241 are located outside the range in which the resistive heat generators 56 are provided. Such a configuration reduces the heat conduction from the heater 22 to the stay 24 and allows the heater 22 to efficiently heat the fixing belt 20.

The heater holder 23 is provided with the guides 66 that guide the fixing belt 20. The guides 66 are disposed upstream and downstream from the heater 22 in the direction R2 in which the fixing belt 20 rotates. The upstream and downstream guides 66 are disposed at intervals in the longitudinal direction of the heater 22. Each of the guides 66 is shaped like a fan and has an arc or convex belt-side face extending in the circumferential direction of the fixing belt 20 and facing the inner circumferential surface of the fixing belt 20.

Like the heater 22 illustrated in FIG. 18, the heater 22 illustrated in FIG. 22 includes the resistive heat generators 56 that are spaced from each other in the longitudinal direction of the heater 22. However, when the resistive heat generators 56 are spaced from each other, the temperature of the heater 22 tends to be lower in the division areas B, which are intervals between the resistive heat generators 56, than in the areas where the resistive heat generators 56 are provided. For this reason, the temperature of the fixing belt 20 facing the division areas B may be lowered. In other words, the fixing belt 20 may have an uneven temperature in the longitudinal direction.

In the present embodiment, the first high thermal conductor 89 is disposed to reduce the temperature drop in the division areas B and the temperature unevenness in the longitudinal direction of the fixing belt 20. A detailed description is given below of the first high thermal conductor 89.

Figure 23:
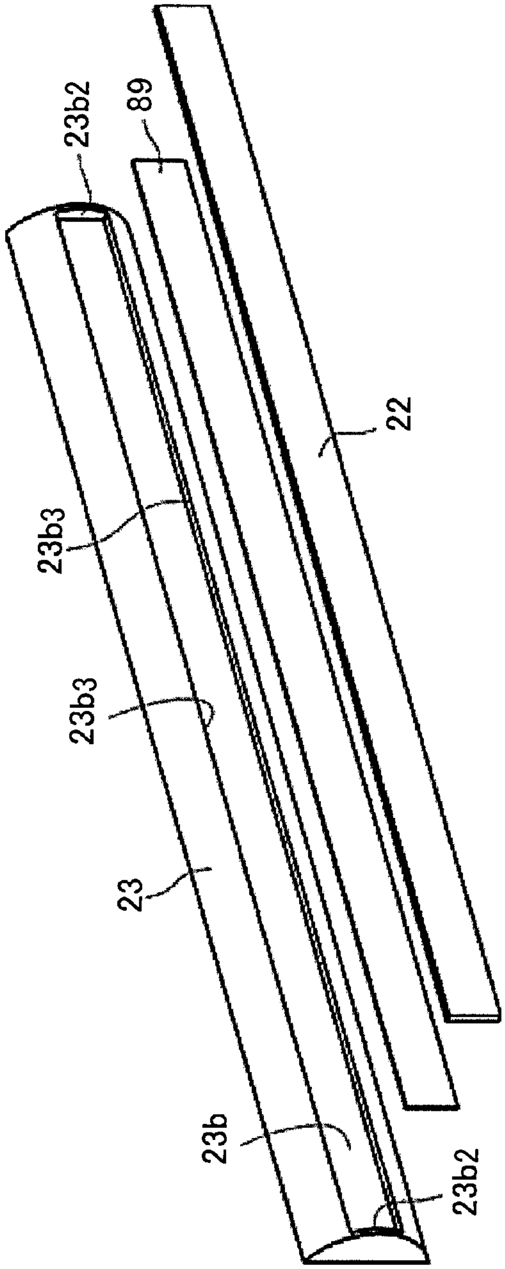
FIG. 23 is a perspective view of a heater, a first high thermal conductor, and a heater holder included in the fixing device of FIG. 22.

As illustrated in FIG. 23, the first high thermal conductor 89 is disposed between the heater 22 and the stay 24, and particularly, sandwiched between the heater 22 and the heater holder 23, in the lateral direction in FIG. 23. In other words, the first high thermal conductor 89 has one face in contact with the back side of the base 55 of the heater 22 and the other face (opposite to the one face) in contact with the heater holder 23.

The first high thermal conductor 89 is a plate-shaped member having a uniform thickness. For example, the first high thermal conductor 89 has a thickness of 0.3 mm, a length of 222 mm in the longitudinal direction, and a width of 10 mm in a direction intersecting the longitudinal direction. Although the first high thermal conductor 89 is a single plate member according to the present embodiment, the first high thermal conductor 89 may be a plurality of members.

The first high thermal conductor 89 is fitted into the recess 23*b* of the heater holder 23. The heater 22 is attached onto the first high thermal conductor 89. Thus, the first high thermal conductor 89 is sandwiched and held between the heater holder 23 and the heater 22. In the present embodiment, the length of the first high thermal conductor 89 is substantially the same as the length of the heater 22. The movement of the first high thermal conductor 89 and the heater 22 in the longitudinal direction is restrained by the pair of side wall faces 23*b*2, which extends in a direction intersecting the longitudinal direction of the recess 23*b*. The side wall faces 23*b*2 serve as restraints in the longitudinal direction. Since the longitudinal displacement of the first high thermal conductor 89 in the fixing device 10 is regulated, the thermal conduction efficiency is enhanced with respect to the target range in the longitudinal direction. The movement of the first high thermal conductor 89 and the heater 22 in the direction intersecting the longitudinal direction is restrained by the pair of side wall faces 23*b*3, which extends in the longitudinal direction of the recess 23*b*. The side wall faces 23*b*3 serve as restraints in the array intersecting direction.

Figure 24:
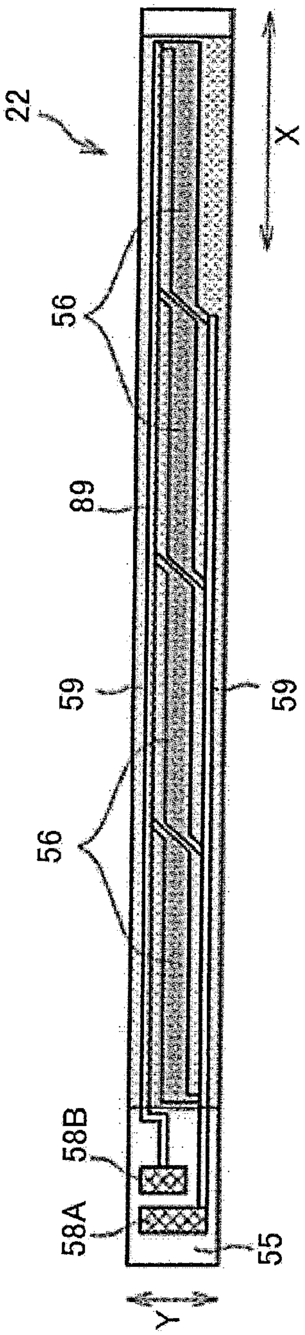
FIG. 24 is a plan view of a heater, illustrating an example of the arrangement of a first high thermal conductor.

The range in the longitudinal direction (indicated by double-head arrow X) in which the first high thermal conductor 89 is disposed is not limited to the range illustrated in FIG. 23. For example, as illustrated in FIG. 24, the first high thermal conductor 89 may be disposed only in the longitudinal range (i.e., hatched range in FIG. 24) in which the resistive heat generators 56 are provided.

Figure 25:
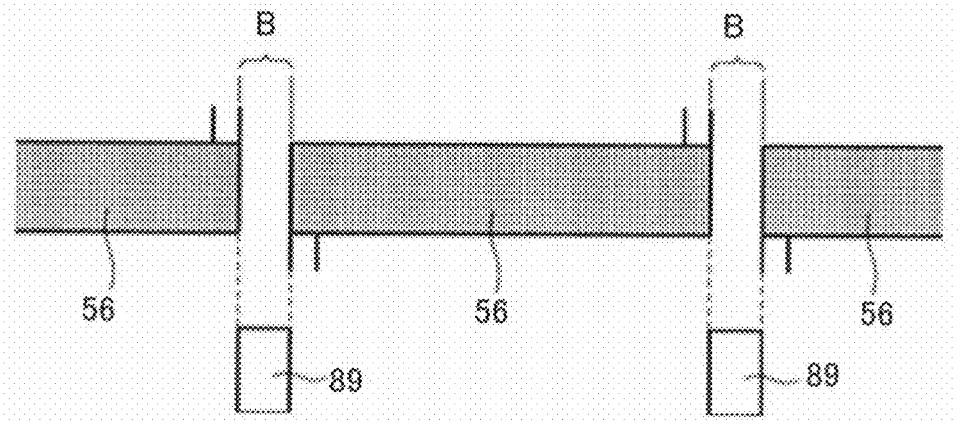
FIG. 25 is a plan view of a heater, illustrating another example of the arrangement of the first high thermal conductor.

Alternatively, as in the example illustrated in FIG. 25, the first high thermal conductor 89 may be disposed only in the entire area at a position corresponding to each interval (i.e., division area B) in the longitudinal direction (indicated by double-head arrow X). The interval may be referred to as the interval B in the following description. Although the resistive heat generators 56 and the first high thermal conductor 89 are shifted in the vertical direction in FIG. 25 for convenience, the resistive heat generators 56 and the first high thermal conductor 89 are disposed at substantially the same position in the direction (indicated by double-head arrow Y) intersecting the longitudinal direction. The direction intersecting the longitudinal direction may be referred to simply as the direction Y in the following description. The first high thermal conductor 89 may be disposed partially in the direction Y of the resistive heat generators 56. Alternatively, as in the example illustrated in FIG. 26, the first high thermal conductor 89 may be disposed entirely in the direction Y of the resistive heat generators 56.

Figure 26:
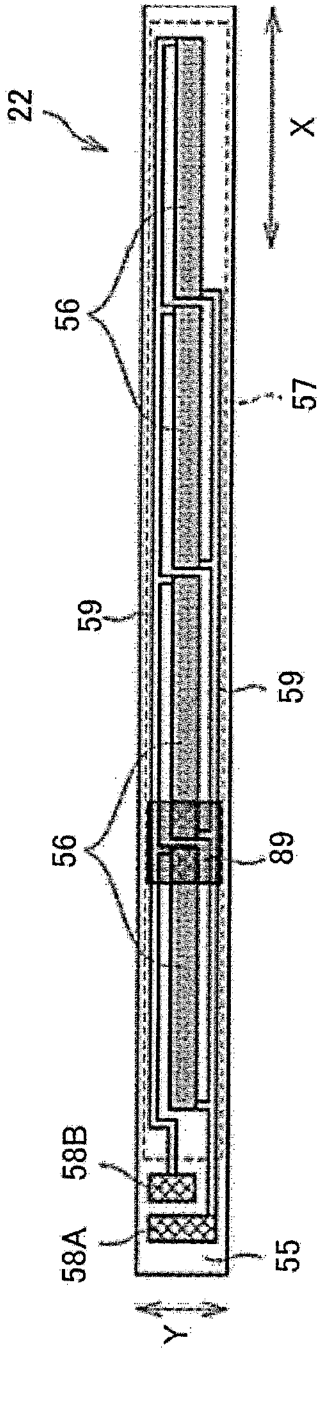
FIG. 26 is a plan view of a heater, illustrating still another example of the arrangement of the first high thermal conductor.

Alternatively, as illustrated in FIG. 26, the first high thermal conductor 89 may be disposed at the position corresponding to the interval B in the longitudinal direction across the resistive heat generators 56 sandwiching the interval B. When the first high thermal conductor 89 is disposed across the resistive heat generators 56 sandwiching the interval B, the position of the first high thermal conductor 89 in the longitudinal direction at least partially overlaps the resistive heat generators 56 sandwiching the interval B. The first high thermal conductor 89 may be disposed at the positions corresponding to all the intervals B of the heater 22. Alternatively, the first high thermal conductor 89 may be disposed at the position corresponding to a part of the intervals B. In the example illustrated in FIG. 26, the first high thermal conductor 89 is disposed at the position corresponding to one interval B. When the first high thermal conductor 89 is disposed at the position corresponding to the interval B, the interval B and at least a part of the first high thermal conductor 89 overlap each other in the longitudinal direction.

The first high thermal conductor 89 is sandwiched between the heater 22 and the heater holder 23 by the pressure from the pressure roller 21 and is in close contact with the heater 22 and the heater holder 23. The first high thermal conductor 89 in contact with the heater 22 enhances the thermal conduction efficiency of the heater 22 in the longitudinal direction. In addition, the first high thermal conductor 89 that is disposed at the position corresponding to the interval B of the heater 22 in the longitudinal direction enhances the thermal conduction efficiency at the interval B and increases the amount of heat conducted to the interval B, resulting in a temperature rise at the interval B. Such a configuration prevents the temperature unevenness in the longitudinal direction of the heater 22 and therefore prevents the temperature unevenness in the longitudinal direction of the fixing belt 20. As a result, an image is fixed onto a sheet without the fixing and gloss unevenness. Since an increased amount of heat generated by the heater 22 is not needed to ensure sufficient fixing performance at the interval B, the fixing device can save energy. In particular, when the first high thermal conductor 89 is disposed over the entire area in the longitudinal direction in which the resistive heat generators 56 are provided, the thermal conduction efficiency of the heater 22 is enhanced over the main area heated by the heater 22 (i.e., the image formation area on the sheet to be conveyed). Thus, the temperature unevenness in the longitudinal direction of the heater 22 and the fixing belt 20 is prevented.

Further, a combination of the first high thermal conductor 89 and the resistive heat generators 56 having a positive temperature coefficient (PTC) characteristic more effectively prevents an excessive temperature rise in a non-conveyance area where a small sheet is not conveyed. The PTC characteristic is a characteristic in which the resistance value increases as the temperature increases, for example, a heater output decreases under a given voltage. In other words, the resistive heat generators 56 having the PTC characteristic effectively reduce the amount of heat generated by the resistive heat generators 56 in the non-conveyance area while the first high thermal conductor 89 effectively conducts the amount of heat in the non-conveyance area whose temperature has increased to a conveyance area where a sheet is conveyed. Such a synergistic effect effectively prevents an excessive temperature rise in the non-conveyance area.

Figure 27:
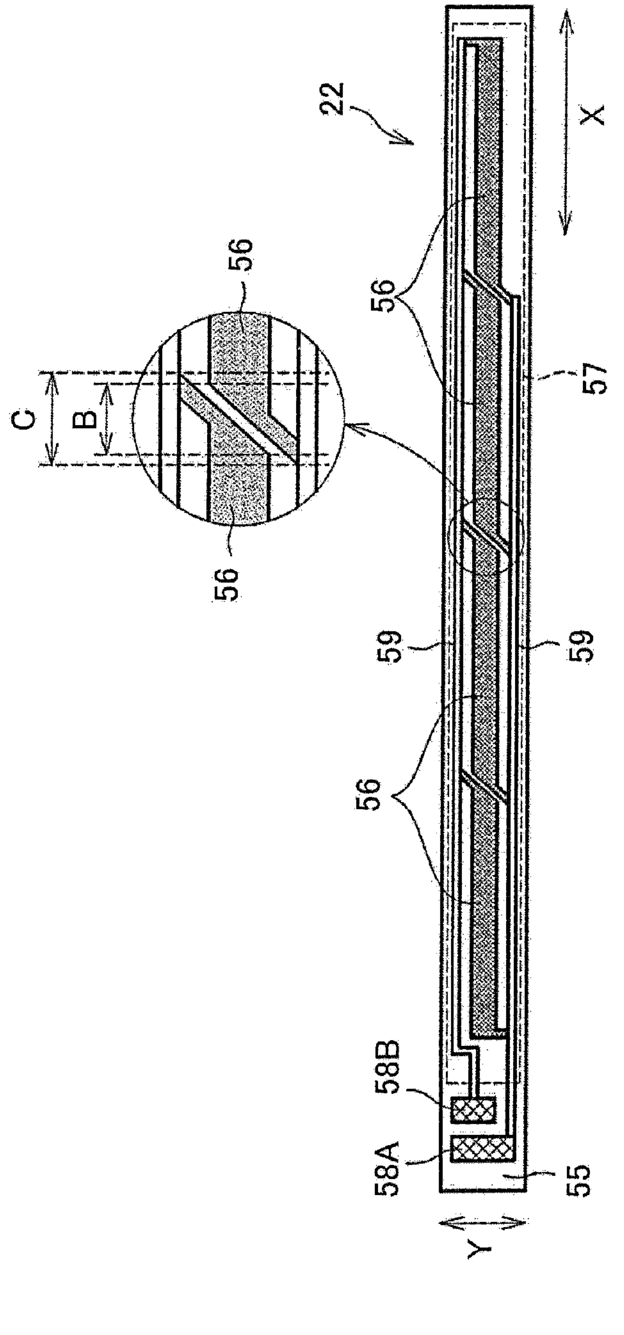
FIG. 27 is a plan view of a heater, illustrating an enlarged divided area according to an embodiment of the present disclosure.

The temperature of the heater 22 decreases around the interval B due to a reduced amount of heat generation at the interval B. For this reason, preferably, the first high thermal conductor 89 is disposed around the interval B. For example, when the first high thermal conductor 89 is disposed at a position corresponding to an enlarged division area C including the area around the interval B illustrated in FIG. 27, the thermal conduction efficiency in the longitudinal direction at the interval B and the surrounding area of the interval B is enhanced. Accordingly, the temperature unevenness in the longitudinal direction of the heater 22 is more effectively prevented. When the first high thermal conductor 89 is disposed over the entire area in the longitudinal direction in which all the resistive heat generators 56 are provided, the temperature unevenness of the heater 22 (the fixing belt 20) in the longitudinal direction is reliably prevented.

A description is given below of fixing devices according to several other embodiments of the present disclosure.

Figure 28:
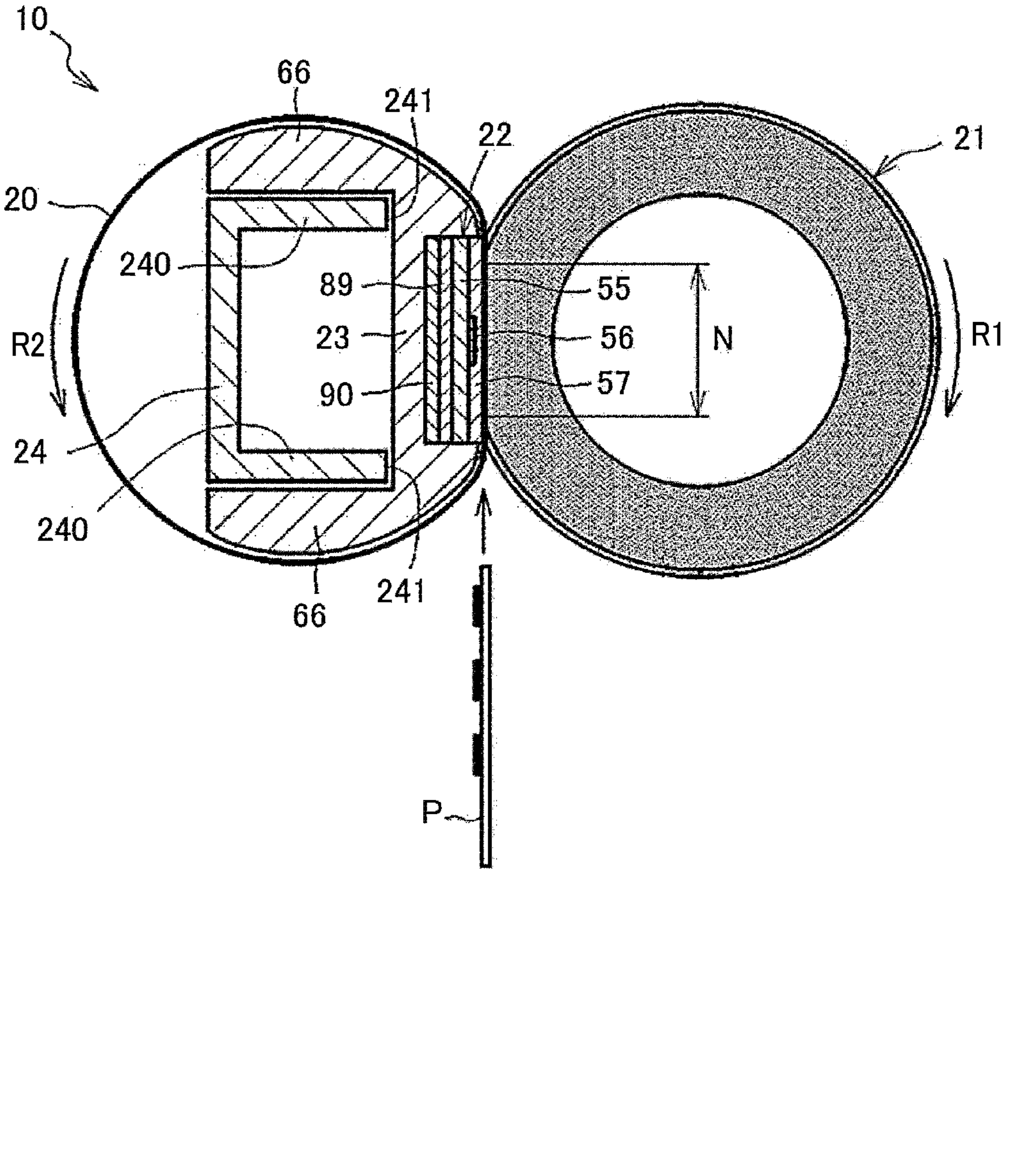
FIG. 28 is a diagram illustrating a configuration of a fixing device according to an embodiment different from the above embodiments of the present disclosure.

The fixing device 10 illustrated in FIG. 28 includes second high thermal conductors 90 between the heater holder 23 and the first high thermal conductor 89. The second high thermal conductors 90 are disposed at positions different from the position of the first high thermal conductor 89 in a stacking direction (i.e., the lateral direction in FIG. 28) of the components such as the heater holder 23, the stay 24, and the first high thermal conductor 89. More specifically, the second high thermal conductors 90 overlap the first high thermal conductor 89. In the present embodiment, the temperature sensor (thermistor) 67 is disposed as in the embodiment illustrated in FIG. 22.

Each of the second high thermal conductors 90 is made of a material having a higher thermal conductivity than the base 55, such as graphene or graphite. In the present embodiment, each of the second high thermal conductors 90 is a graphite sheet having a thickness of 1 mm. Each of the second high thermal conductors 90 may be made of a plate material such as aluminum, copper, or silver.

Figure 29:
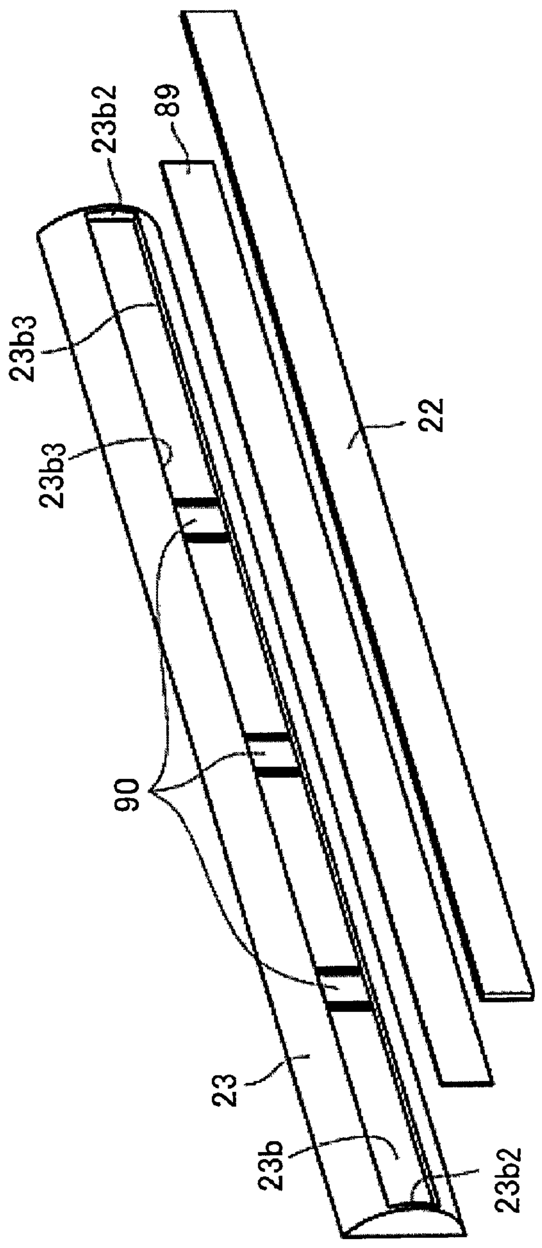
FIG. 29 is a perspective view of a heater, a first high thermal conductor, a second high thermal conductor, and a heater holder included in the fixing device of FIG. 28.

As illustrated in FIG. 29, the second high thermal conductors 90 are disposed in the recess 23*b* of the heater holder 23 with a longitudinal interval between the adjacent second high thermal conductors 90. The heater holder 23 has recesses deeper than the other portion. The second high thermal conductors 90 are disposed at the recesses. Each of the second high thermal conductors 90 is separated from the heater holder 23 through a gap between each longitudinal end of the second high thermal conductor 90 and the heater holder 23. Such a gap reduces the thermal conduction from the second high thermal conductor 90 to the heater holder 23 and allows the heater 22 to efficiently heat the fixing belt 20.

Figure 30:
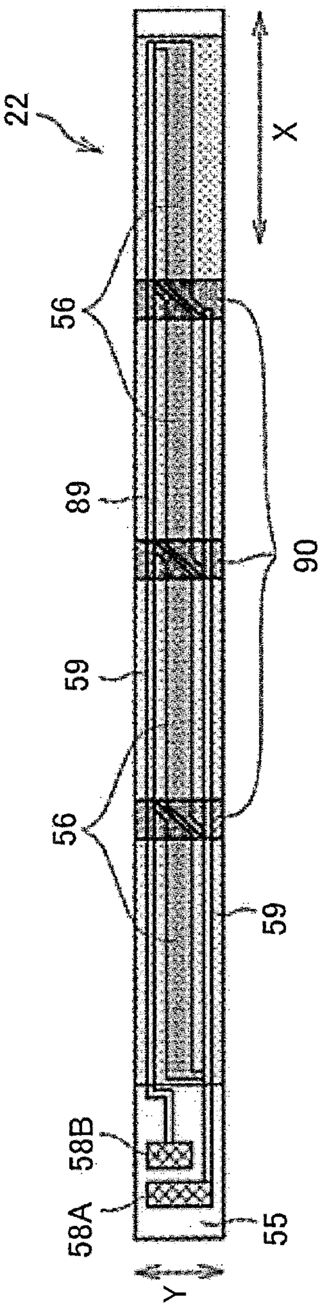
FIG. 30 is a plan view of a heater, illustrating an example of the arrangement of a first high thermal conductor and a second high thermal conductor.

As illustrated in FIG. 30, the second high thermal conductors 90 (hatched in FIG. 30) are disposed at the positions corresponding to the intervals B in the longitudinal direction (indicated by double-headed arrow X) and overlapping at least part of the adjacent resistive heat generators 56. In particular, in the present embodiment, each of the second high thermal conductors 90 is disposed over the entire area of the interval B.

Although each of FIG. 30 and FIG. 31, which will be described later, illustrates a case where the first high thermal conductor 89 is disposed over the entire area in the longitudinal direction where all the resistive heat generators 56 are provided, the range in which the first high thermal conductor 89 is disposed is not limited to the range illustrated in each of FIGS. 30 and 31.

The fixing device 10 according to the present embodiment includes, in addition to the first high thermal conductor 89, the second high thermal conductors 90 at the positions corresponding to the intervals B in the longitudinal direction and overlapping at least part of the adjacent resistive heat generators 56. Thus, the thermal conduction efficiency in the longitudinal direction at the intervals B is further enhanced and the temperature unevenness in the longitudinal direction of the heater 22 is more effectively prevented. Most preferably, as illustrated in FIG. 31, the first high thermal conductor 89 and the second high thermal conductor 90 are disposed only in the entire area at the position corresponding to the interval B. Thus, the thermal conduction efficiency can be enhanced particularly at the position corresponding to the interval B as compared with the other areas.

Figure 31:
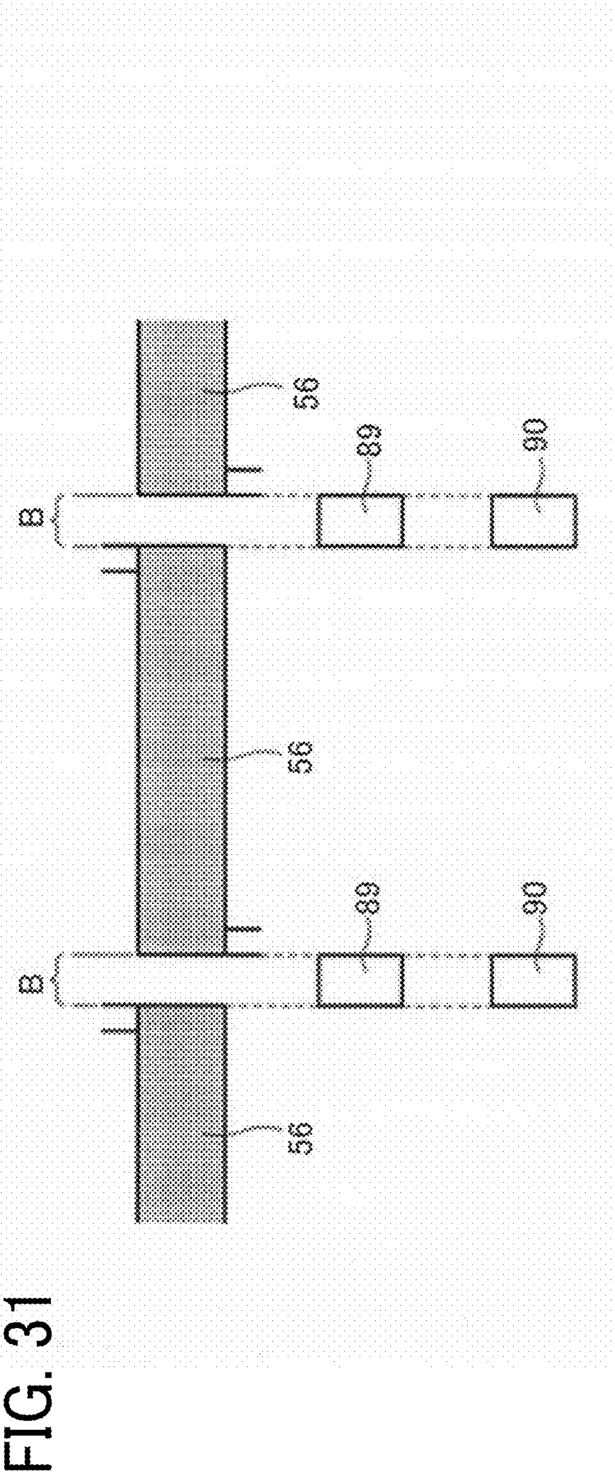
FIG. 31 is a plan view of a heater, illustrating another example of the arrangement of the first high thermal conductor and the second high thermal conductor.

Although the resistive heat generators 56, the first high thermal conductor 89, and the second high thermal conductors 90 are shifted from each other in the vertical direction in FIG. 31 for convenience, the resistive heat generators 56, the first high thermal conductor 89, and the second high thermal conductors 90 are disposed at substantially the same position in the direction Y. Alternatively, for example, the first high thermal conductor 89 and the second high thermal conductors 90 may be disposed partially or entirely in the direction Y of the resistive heat generators 56.

Each of the first high thermal conductor 89 and the second high thermal conductors 90 may be made of a graphene sheet. In this case, each of the first high thermal conductor 89 and the second high thermal conductors 90 has a high thermal conductivity in a predetermined direction along the plane of graphene, that is, in the longitudinal direction, not in the thickness direction. Accordingly, the temperature unevenness in the longitudinal direction of the heater 22 and the fixing belt 20 can be effectively prevented.

Figure 34:
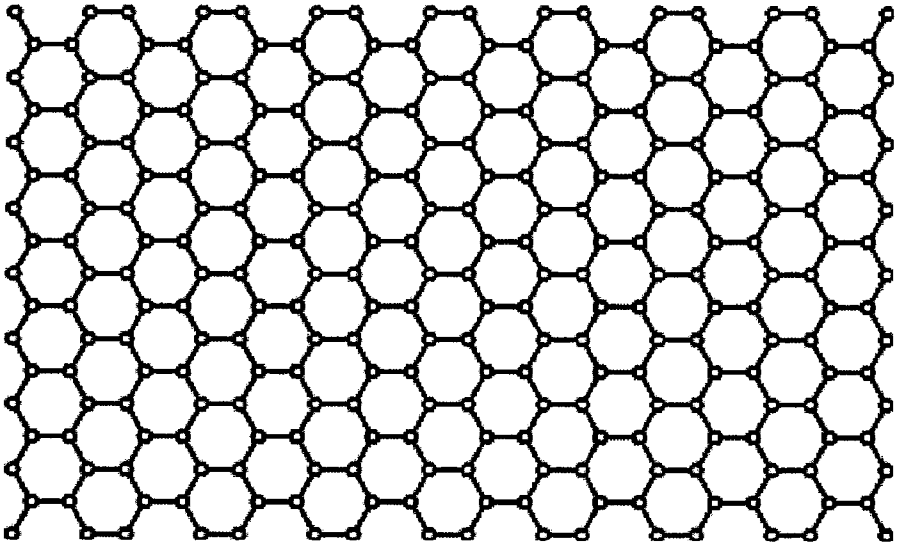
FIG. 34 is a diagram illustrating the atomic crystal structure of graphene.

Graphene is a flaky powder. Graphene consists of a planar hexagonal lattice structure of carbon atoms, as illustrated in FIG. 34. The graphene sheet is sheet-shaped graphene and is usually a single layer. The graphene sheet may contain impurities in a single layer of carbon or may have a fullerene structure. Fullerene structures are generally recognized as compounds consisting of equal numbers of carbons forming polycycles of five and six membered rings fused in a cage, such as C60, C70, and C80 fullerenes or other closed cage structures with three coordinated carbons.

Graphene sheets are artificial and can be produced by, for example, the chemical vapor deposition (CVD) method.

A commercially available product can be used as the graphene sheet. For example, the size and thickness of the graphene sheet and the number of layers of the graphite sheet described below are measured by a transmission electron microscope (TEM).

Figure 35:
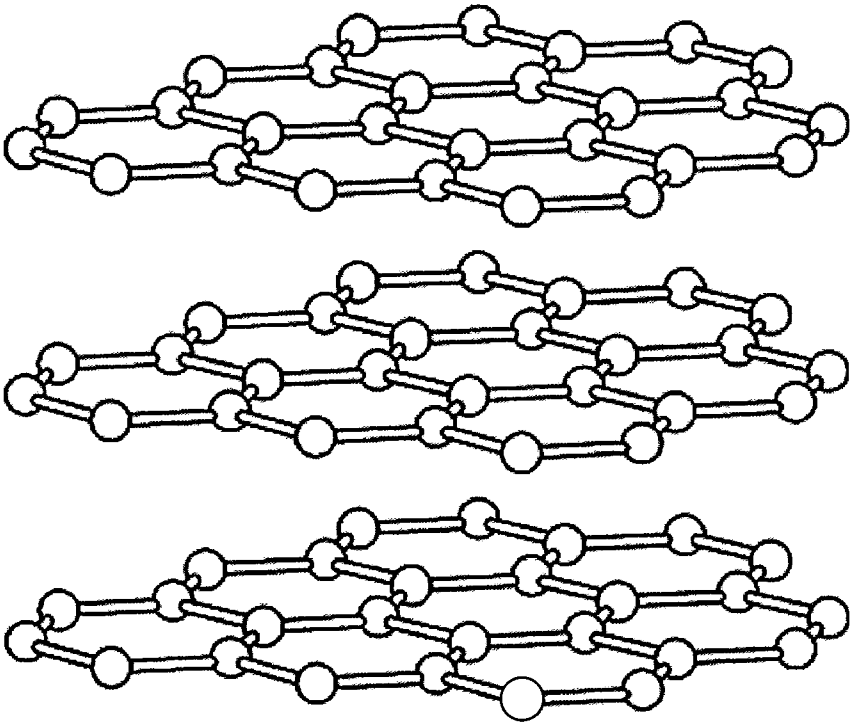
FIG. 35 is a diagram illustrating the atomic crystal structure of graphite.

Graphite in which graphene is multilayered has a large thermal conductivity anisotropy. As illustrated in FIG. 35, graphite has a crystal structure in which layers of condensed six membered ring planes of carbon atoms spread in a planar shape are stacked. In this crystal structure, carbon atoms adjacent to each other in a layer form a covalent bond, and carbon atoms between layers form a van der Waals bond. The covalent bond has a larger bonding force than the van der Waals bond. The covalent bond has a large anisotropy between the bond in the layer and the bond between the layers. In other words, the first high thermal conductor 89 or the second high thermal conductor 90 made of graphite exhibits a greater thermal conduction efficiency in the longitudinal direction than in the thickness direction (that is, the stacking direction of the components), and thus reduces the thermal conduction to the heater holder 23. Accordingly, the temperature unevenness in the longitudinal direction of the heater 22 can be efficiently prevented and less heat flows out to the heater holder 23. In addition, the first high thermal conductor 89 or the second high thermal conductor 90 made of graphite has an excellent heat resistance that prevents oxidation up to about 700° C.

The physical properties and dimensions of the graphite sheet can be changed as appropriate for the function required for the first high thermal conductor 89 or the second high thermal conductor 90. For example, the anisotropic thermal conduction can be enhanced by using high-purity graphite or single-crystal graphite or by thickening the graphite sheet. A thin graphite sheet may be used to reduce the thermal capacity of the fixing device and increase the speed of the fixing device. When the fixing nip N and the heater 22 are large in width, the first high thermal conductor 89 or the second high thermal conductor 90 may be increased in dimension along the width of the fixing nip N and the heater 22.

From the viewpoint of enhancing the mechanical strength, the number of layers of the graphite sheet is preferably 11 or more. The graphite sheet may partially include a single-layer portion and a multilayer portion.

Figure 32:
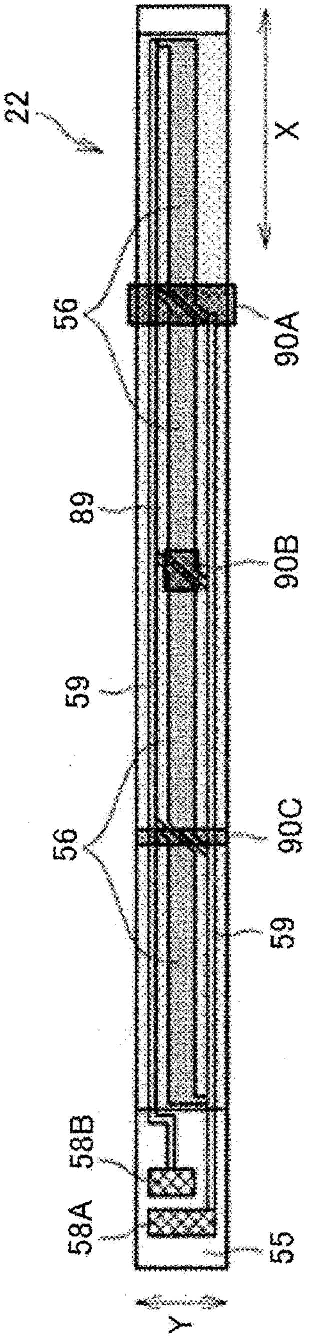
FIG. 32 is a plan view of a heater, illustrating still another example of the arrangement of the second high thermal conductor.

The positions of the second high thermal conductors 90 are not limited to the positions illustrated in FIG. 30 provided that the second high thermal conductors 90 are disposed at the positions corresponding to the intervals B (and the enlarged division areas C) in the longitudinal direction and overlapping at least part of the adjacent resistive heat generators 56. For example, as in the example illustrated in FIG. 32, a second high thermal conductor 90A may project beyond the width of the base 55 in the direction Y. A second high thermal conductor 90B may be disposed in a range in which the resistive heat generators 56 are provided in the direction Y. A second high thermal conductor 90C may be disposed in a part of the interval B.

Figure 33:
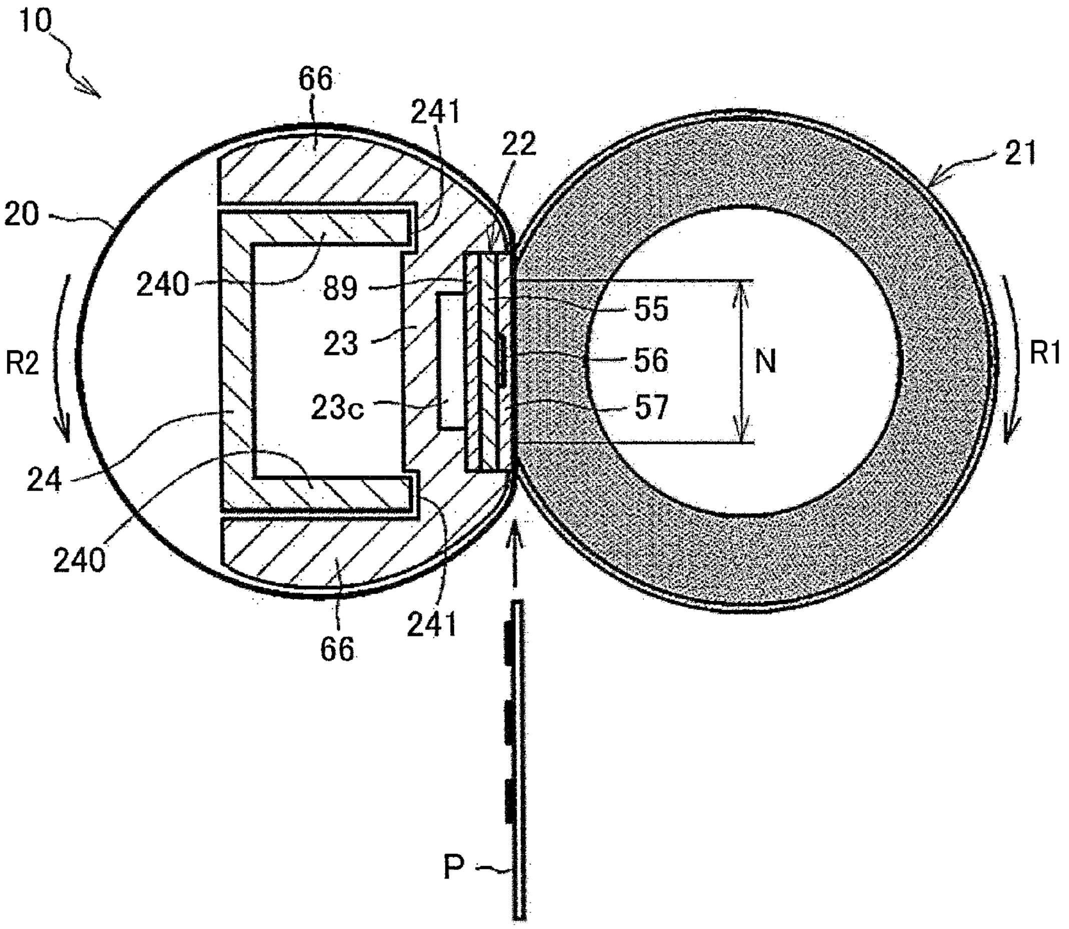
FIG. 33 is a diagram illustrating a configuration of a fixing device according to an embodiment different from the above embodiments of the present disclosure.

In another embodiment illustrated in FIG. 33, a gap in the thickness direction (i.e., the lateral direction in FIG. 33) is interposed between the first high thermal conductor 89 and the heater holder 23. In other words, the heater holder 23 includes a clearance 23*c* as a heat insulation layer in a partial area of the recess 23*b* (see FIG. 29) where the heater 22, the first high thermal conductor 89, and the second high thermal conductors 90 are disposed.

The clearance 23*c* is provided in a partial area in the longitudinal direction other than a portion where the second high thermal conductor 90 is disposed. The clearance 23*c* is a portion deeper than the other portion of the recess 23*b* of the heater holder 23. Since the clearance 23*c* reduces an area of contact between the heater holder 23 and the first high thermal conductor 89, the thermal conduction from the first high thermal conductor 89 to the heater holder 23 is reduced and the heater 22 can efficiently heat the fixing belt 20.

In the longitudinal cross-section in which the second high thermal conductors 90 are disposed, the second high thermal conductors 90 contact the heater holder 23 as in the embodiment illustrated in FIG. 28.

In the present embodiment, the clearance 23*c* is provided over the entire range in which the resistive heat generators 56 are provided in the direction Y (i.e., the vertical direction in FIG. 33). Such a configuration effectively reduces the thermal conduction from the first high thermal conductor 89 to the heater holder 23 and enhances the efficiency of heating the fixing belt 20 by the heater 22. The heat insulation layer may be a space such as the clearance 23*c*, or a heat insulator having a lower thermal conductivity than the heater holder 23.

In the present embodiment, the second high thermal conductor 90 is different from the first high thermal conductor 89. Alternatively, for example, the first high thermal conductor 89 may have a portion corresponding to the interval B thicker than the other portion to function as the second high thermal conductor 90.

A description is now given below of several aspects of the present disclosure.

According to a first aspect, a fixing device, which is detachably attachable to an image forming apparatus, includes a housing frame that includes a support plate, as the back side of the housing frame in an insertion direction in which the fixing device is inserted into the image forming apparatus, and a pair of side plates extending in the insertion direction. The housing frame has an open front side in the insertion direction. The support plate includes an extension extending beyond one of the pair of side plates. The extension includes an engaged portion to be engaged with an engaging portion of the image forming apparatus when the fixing device is mounted on the image forming apparatus. The engaging portion is a portion for identifying the compatibility of the fixing device.

According to a second aspect, in the fixing device of the first aspect, the extension includes the engaged portion to be engaged with the engaging portion of a body cover of the image forming apparatus or a plate of a fixing-device housing of the image forming apparatus when the fixing device is mounted on the image forming apparatus. The engaging portion is a portion for identifying the compatibility of the fixing device.

According to a third aspect, in the fixing device of the first or second aspect, the engaged portion of the extension being engaged with the engaging portion activates a detector on the engaging portion to detect an engagement state between the fixing device and the image forming apparatus when the fixing device is mounted on the image forming apparatus.

According to a fourth aspect, in the fixing device of any one of the first to third aspects, the extension includes a connector to be electrically connected to the image forming apparatus when the fixing device is mounted on the image forming apparatus.

According to a fifth aspect, an image forming apparatus includes an engaging portion for identifying the compatibility of a fixing device to be mounted and the fixing device according to any one of the first to fourth aspects.

According to a sixth aspect, in the image forming apparatus of the fifth aspect, the engaging portion includes a detector to detect an engagement state between the fixing device and the image forming apparatus. The detector is a push switch.

According to one or more aspects of the present disclosure, a fixing device having a housing frame reduced in size and cost is prevented from being erroneously mounted on an image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device detachably attachable to an image forming apparatus, the fixing device comprising:

a housing frame having an open front side in an insertion direction in which the fixing device is to be inserted into the image forming apparatus, the housing frame including:

a support plate as a back side of the housing frame in the insertion direction; and a pair of side plates extending in the insertion direction, the support plate including an extension extending beyond one of the pair of side plates, the extension including an engaged portion to be engaged with an engaging portion of the image forming apparatus when the fixing device is mounted on the image forming apparatus.

2. The fixing device according to claim 1, wherein the engaged portion of the extension being engaged with the engaging portion activates a detector on the engaging portion to detect an engagement state between the fixing device and the image forming apparatus when the fixing device is mounted on the image forming apparatus.

3. The fixing device according to claim 1, wherein the extension includes a connector to be electrically connected to the image forming apparatus when the fixing device is mounted on the image forming apparatus.

4. An image forming apparatus, comprising:
the engaging portion; and
the fixing device according to claim 1.

5. The image forming apparatus according to claim 4, wherein the engaging portion includes a detector to detect an engagement state between the fixing device and the image forming apparatus, and
wherein the detector is a push switch.

6. The image forming apparatus according to claim 4, further comprising:
a body cover including the engaging portion.

7. The image forming apparatus according to claim 4, further comprising:
a fixing-device housing including a plate, the plate including the engaging portion.

* * * * *